United States Patent
Young et al.

(10) Patent No.: US 11,421,875 B2
(45) Date of Patent: *Aug. 23, 2022

(54) BURNER CONTROL SYSTEM

(71) Applicant: Honeywell International Inc., Morris Plains, NJ (US)

(72) Inventors: Gregory Young, Richfield, MN (US); David Kucera, Bilovice nad Svitavou (CZ); Donald J. Kasprzyk, Maple Grove, MN (US); Willem Super, Emmen (NL); Jos Praat, Drenthe (NL); Roelof Thiewes, Drenthe (NL); Hans M. van der Mei, Drenthe (NL); Brian Zabel, Yorktown, IN (US); John D. Mitchell, Maple Grove, MN (US)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 268 days.

This patent is subject to a terminal disclaimer.

(21) Appl. No.: 16/548,461

(22) Filed: Aug. 22, 2019

(65) Prior Publication Data
US 2019/0376688 A1    Dec. 12, 2019

Related U.S. Application Data

(63) Continuation of application No. 15/600,403, filed on May 19, 2017, now Pat. No. 10,422,531, which is a (Continued)

(51) Int. Cl.
*F23N 1/02*    (2006.01)
*F23N 5/00*    (2006.01)
(Continued)

(52) U.S. Cl.
CPC ............. *F23N 1/022* (2013.01); *F23N 5/003* (2013.01); *G01F 5/005* (2013.01); *G01G 1/36* (2013.01);
(Continued)

(58) Field of Classification Search
CPC ........ F23D 2208/10; F23K 5/002; F23K 5/16; F23K 2203/104; F23K 2900/05001;
(Continued)

(56) References Cited

U.S. PATENT DOCUMENTS

| 156,769 A | 11/1874 | Cameron |
| 424,581 A | 4/1890 | Sickels |

(Continued)

FOREIGN PATENT DOCUMENTS

| DE | 3638604 | 5/1988 |
| DE | 3818363 | 4/1989 |

(Continued)

OTHER PUBLICATIONS

"DE_3818363_A1_M—Machine Translation.pdf", machine translation, EPO.org, May 15, 2019. (Year: 2019).*

(Continued)

*Primary Examiner* — Steven B McAllister
*Assistant Examiner* — Daniel E. Namay
(74) *Attorney, Agent, or Firm* — Seager, Tufte & Wickhem, LLP

(57) ABSTRACT

A burner control system for improving burner performance and efficiency may determine fuel and air channel or manifold parameters. Determination of parameters may be performed with a sensor connected across the air and fuel channels. A signal from the sensor may control the parameters which in turn affect the amounts of fuel and air to the burner via a controller. Parameter control of the fuel and air in their respective channels may result in more accurate fuel and air ratio control. One or more flow restrictors in fuel and/or air bypass channels may further improve accuracy of the fuel and air ratio. The channels may be interconnected with a pressure or flow divider. Byproducts of combustion in the exhaust, temperatures of gas and air, flame quality and/or (Continued)

other items may be monitored and adjusted with control of the fuel and air ratio for optimum combustion in the burner.

20 Claims, 3 Drawing Sheets

Related U.S. Application Data continuation-in-part of application No. 14/992,826, filed on Jan. 11, 2016, now Pat. No. 9,657,946, and a continuation-in-part of application No. 14/485,519, filed on Sep. 12, 2014, now Pat. No. 10,317,076, application No. 14/992,826, which is a continuation of application No. 13/621,175, filed on Sep. 15, 2012, now Pat. No. 9,234,661.

(51) Int. Cl.
  *G01F 5/00* (2006.01)
  *G01G 1/36* (2006.01)

(52) U.S. Cl.
  CPC ............ *F23N 2225/06* (2020.01); *F23N 2900/05181* (2013.01)

(58) Field of Classification Search
  CPC .. F23K 2900/07006; F23N 1/02; F23N 1/022; F23N 1/025; F23N 1/027; F23N 5/003; F23N 2025/06; F23N 2037/20; F23N 2900/05181; G01F 1/34; G01F 5/005; G01G 1/36
  USPC ............... 431/12, 18, 76, 89, 38, 90; 137/7, 137/118.06, 87.04
  See application file for complete search history.

(56) References Cited

U.S. PATENT DOCUMENTS

| | | |
|---|---|---|
| 1,033,204 A | 7/1912 | Skinner |
| 1,147,840 A | 7/1915 | Bowser |
| 1,156,977 A | 10/1915 | Cloos |
| 1,165,315 A | 12/1915 | Cameron |
| 1,206,532 A | 11/1916 | Gray |
| 1,847,385 A | 3/1932 | Dengler |
| 2,093,122 A | 9/1937 | Andrews |
| 2,196,798 A | 4/1940 | Horstmann |
| 2,403,692 A | 7/1946 | Tibbetts |
| 2,440,329 A | 4/1948 | Doble |
| 2,497,549 A | 2/1950 | Heller |
| 2,561,793 A | 7/1951 | Furczyk |
| 2,791,238 A | 5/1957 | Bryant |
| 2,975,307 A | 3/1961 | Schroeder et al. |
| 3,164,364 A | 1/1965 | McColl |
| 3,202,170 A | 8/1965 | Holbrook |
| 3,304,406 A | 2/1967 | King |
| 3,346,008 A | 10/1967 | Scaramucci |
| 3,381,623 A | 5/1968 | Elliott |
| 3,391,866 A * | 7/1968 | Rohrer .................... F23N 5/187 236/14 |
| 3,393,965 A | 7/1968 | Vaughan |
| 3,414,010 A | 12/1968 | Sparrow |
| 3,493,005 A | 2/1970 | Kakegawa |
| 3,641,373 A | 2/1972 | Elkuch |
| 3,646,969 A | 3/1972 | Stampfli |
| 3,744,754 A | 7/1973 | Demi |
| 3,768,955 A | 10/1973 | McLaughlin |
| 3,769,531 A | 10/1973 | Elkuch |
| 3,803,424 A | 4/1974 | Smiley et al. |
| 3,884,266 A | 5/1975 | Kondo |
| 3,947,644 A | 3/1976 | Uchikawa |
| 3,960,364 A | 6/1976 | Hargrave |
| 3,973,576 A | 8/1976 | Dietiker |
| 3,973,976 A | 8/1976 | Boyd |
| 3,993,939 A | 11/1976 | Slavin et al. |
| 4,114,652 A | 9/1978 | Oberle |
| 4,115,036 A | 9/1978 | Paterson |
| 4,140,936 A | 2/1979 | Bullock |
| 4,188,013 A | 2/1980 | Battersby et al. |
| 4,188,972 A | 2/1980 | Van Der Zee |
| 4,197,737 A | 4/1980 | Pittman |
| 4,242,080 A | 12/1980 | Tabei |
| 4,277,832 A | 7/1981 | Wong |
| 4,360,955 A | 11/1982 | Block |
| 4,402,340 A | 9/1983 | Lockwood, Jr. |
| 4,406,131 A | 9/1983 | Weasel, Jr. |
| 4,418,886 A | 12/1983 | Holzer |
| 4,442,853 A | 4/1984 | Gort |
| 4,450,868 A | 5/1984 | Duval et al. |
| 4,453,169 A | 6/1984 | Martner |
| 4,478,076 A | 10/1984 | Bohrer |
| 4,478,077 A | 10/1984 | Bohrer et al. |
| 4,481,776 A | 11/1984 | Araki et al. |
| 4,493,303 A | 1/1985 | Thompson et al. |
| 4,498,850 A | 2/1985 | Perlov et al. |
| 4,501,144 A | 2/1985 | Higashi et al. |
| 4,539,575 A | 9/1985 | Nilsson |
| 4,543,974 A | 10/1985 | Dietiker et al. |
| 4,576,050 A | 3/1986 | Lambert |
| 4,581,624 A | 4/1986 | O'Connor |
| 4,581,707 A | 4/1986 | Millar |
| 4,585,209 A | 4/1986 | Aine et al. |
| 4,613,072 A | 9/1986 | Kikuchi et al. |
| 4,619,438 A | 10/1986 | Coffee |
| 4,622,699 A | 11/1986 | Spriggs |
| 4,622,999 A | 11/1986 | Ray |
| 4,628,499 A | 12/1986 | Hammett |
| 4,645,450 A | 2/1987 | West |
| 4,651,564 A | 3/1987 | Johnson et al. |
| 4,654,546 A | 3/1987 | Kirjavainen |
| 4,698,015 A | 10/1987 | Brunel |
| 4,722,360 A | 2/1988 | Odajima et al. |
| 4,756,508 A | 7/1988 | Giachino et al. |
| 4,815,699 A | 3/1989 | Mueller |
| 4,821,999 A | 4/1989 | Ohtaka |
| 4,829,826 A | 5/1989 | Valentin et al. |
| 4,835,717 A | 5/1989 | Michel et al. |
| 4,836,247 A | 6/1989 | Chuang |
| 4,898,200 A | 2/1990 | Odajima et al. |
| 4,911,616 A | 3/1990 | Laumann, Jr. |
| 4,915,613 A | 4/1990 | Landis |
| 4,938,742 A | 7/1990 | Smits |
| 4,939,405 A | 7/1990 | Okuyama et al. |
| 5,022,435 A | 6/1991 | Jaw-Shiunn |
| 5,057,822 A | 10/1991 | Hoffman |
| 5,065,978 A | 11/1991 | Albarda et al. |
| 5,069,419 A | 12/1991 | Jerman |
| 5,070,252 A | 12/1991 | Castenschiold et al. |
| 5,078,581 A | 1/1992 | Blum et al. |
| 5,082,242 A | 1/1992 | Bonne et al. |
| 5,082,246 A | 1/1992 | Stanley et al. |
| 5,085,562 A | 2/1992 | Van Lintel |
| 5,096,388 A | 3/1992 | Weinberg |
| 5,129,794 A | 7/1992 | Beatty |
| 5,146,941 A | 9/1992 | Statler |
| 5,148,074 A | 9/1992 | Fujita et al. |
| 5,171,132 A | 12/1992 | Miyazaki et al. |
| 5,176,358 A | 1/1993 | Bonne et al. |
| 5,180,288 A | 1/1993 | Richter et al. |
| 5,180,623 A | 1/1993 | Ohnstein |
| 5,186,054 A | 2/1993 | Sekimura |
| 5,190,068 A | 3/1993 | Philbin |
| 5,192,197 A | 3/1993 | Culp |
| 5,193,993 A | 3/1993 | Dietiker |
| 5,199,456 A | 4/1993 | Love et al. |
| 5,199,462 A | 4/1993 | Baker |
| 5,203,688 A | 4/1993 | Dietiker |
| 5,205,323 A | 4/1993 | Baker |
| 5,206,557 A | 4/1993 | Bobbio |
| 5,215,112 A | 6/1993 | Davison |
| 5,215,115 A | 6/1993 | Dietiker |
| 5,219,278 A | 6/1993 | Van Lintel |
| 5,224,843 A | 7/1993 | Van Lintel |

(56) References Cited

U.S. PATENT DOCUMENTS

| | | |
|---|---|---|
| 5,244,527 A | 9/1993 | Aoyagi |
| 5,244,537 A | 9/1993 | Ohnstein |
| 5,263,514 A | 11/1993 | Reeves |
| 5,294,089 A | 3/1994 | LaMarca |
| 5,322,258 A | 6/1994 | Bosch et al. |
| 5,323,999 A | 6/1994 | Bonne |
| 5,325,880 A | 7/1994 | Johnson et al. |
| 5,336,062 A | 8/1994 | Richter |
| 5,368,571 A | 11/1994 | Horres, Jr. |
| 5,388,607 A | 2/1995 | Ramaker et al. |
| 5,441,597 A | 8/1995 | Bonne et al. |
| 5,449,142 A | 9/1995 | Banick |
| 5,452,878 A | 9/1995 | Gravesen et al. |
| 5,460,196 A | 10/1995 | Yonnet |
| 5,477,877 A | 12/1995 | Schulze et al. |
| 5,499,909 A | 3/1996 | Yamada et al. |
| 5,513,611 A | 5/1996 | Ricouard et al. |
| 5,520,533 A | 5/1996 | Vrolijk |
| 5,526,172 A | 6/1996 | Kanack |
| 5,529,465 A | 6/1996 | Zengerle et al. |
| 5,536,963 A | 7/1996 | Polla |
| 5,538,220 A | 7/1996 | LaMarca |
| 5,541,465 A | 7/1996 | Higuchi et al. |
| 5,552,654 A | 9/1996 | Konno et al. |
| 5,565,832 A | 10/1996 | Haller et al. |
| 5,571,401 A | 11/1996 | Lewis et al. |
| 5,580,444 A | 12/1996 | Burrows |
| 5,590,235 A | 12/1996 | Rappenecker et al. |
| 5,621,164 A | 4/1997 | Woodbury et al. |
| 5,642,015 A | 6/1997 | Whitehead et al. |
| 5,676,342 A | 10/1997 | Otto et al. |
| 5,683,159 A | 11/1997 | Johnson |
| 5,685,707 A | 11/1997 | Ramsdell et al. |
| 5,696,662 A | 12/1997 | Bauhahn |
| 5,725,363 A | 3/1998 | Bustgens et al. |
| 5,735,503 A | 4/1998 | Hietkamp |
| 5,741,978 A | 4/1998 | Gudmundsson |
| 5,748,432 A | 5/1998 | Przywozny et al. |
| 5,755,259 A | 5/1998 | Schulze et al. |
| 5,759,014 A | 6/1998 | Van Lintel |
| 5,759,015 A | 6/1998 | Van Lintel et al. |
| 5,769,043 A | 6/1998 | Nitkiewicz |
| 5,774,372 A | 6/1998 | Berwanger |
| 5,790,420 A | 8/1998 | Lang |
| 5,792,957 A | 8/1998 | Luder et al. |
| 5,797,358 A | 8/1998 | Brandt et al. |
| 5,808,205 A | 9/1998 | Romo |
| 5,822,170 A | 10/1998 | Cabuz et al. |
| 5,827,950 A | 10/1998 | Woodbury et al. |
| 5,836,750 A | 11/1998 | Cabuz |
| 5,839,467 A | 11/1998 | Saaski et al. |
| 5,847,523 A | 12/1998 | Rappenecker et al. |
| 5,863,708 A | 1/1999 | Zanzucchi et al. |
| 5,887,847 A | 3/1999 | Holborow |
| 5,893,389 A | 4/1999 | Cunningham |
| 5,901,939 A | 5/1999 | Cabuz et al. |
| 5,911,872 A | 6/1999 | Lewis et al. |
| 5,918,852 A | 7/1999 | Otto |
| 5,933,573 A | 8/1999 | Lukenich et al. |
| 5,944,257 A | 8/1999 | Dietiker et al. |
| 5,954,079 A | 9/1999 | Barth et al. |
| 5,954,089 A | 9/1999 | Seymour |
| 5,957,158 A | 9/1999 | Volz et al. |
| 5,959,448 A | 9/1999 | Baranski et al. |
| 5,967,124 A | 10/1999 | Cook et al. |
| 5,971,355 A | 10/1999 | Biegelsen et al. |
| 5,982,274 A | 11/1999 | Stetler et al. |
| 5,986,573 A | 11/1999 | Franklin et al. |
| 6,003,552 A | 12/1999 | Shank et al. |
| 6,021,652 A | 2/2000 | Walker |
| 6,050,281 A | 4/2000 | Adams et al. |
| 6,057,771 A | 5/2000 | Lakra |
| 6,077,068 A | 6/2000 | Okumura |
| 6,106,245 A | 8/2000 | Cabuz |
| 6,109,889 A | 8/2000 | Zengerle et al. |
| 6,116,863 A | 9/2000 | Ahn et al. |
| 6,122,973 A | 9/2000 | Nomura et al. |
| 6,151,967 A | 11/2000 | McIntosh et al. |
| 6,152,168 A | 11/2000 | Ohmi et al. |
| 6,155,531 A | 12/2000 | Holborow et al. |
| 6,167,761 B1 | 1/2001 | Hanzawa et al. |
| 6,176,247 B1 | 1/2001 | Winchcomb et al. |
| 6,179,000 B1 | 1/2001 | Zdobinski et al. |
| 6,179,586 B1 | 1/2001 | Herb et al. |
| 6,182,941 B1 | 2/2001 | Scheurenbrand et al. |
| 6,184,607 B1 | 2/2001 | Cabuz et al. |
| 6,189,568 B1 | 2/2001 | Bergum et al. |
| 6,213,758 B1 | 4/2001 | Tesar et al. |
| 6,215,221 B1 | 4/2001 | Cabuz et al. |
| 6,240,944 B1 | 6/2001 | Ohnstein et al. |
| 6,242,909 B1 | 6/2001 | Dorsey et al. |
| 6,247,919 B1 | 6/2001 | Welz, Jr. et al. |
| 6,255,609 B1 | 7/2001 | Samuelson et al. |
| 6,263,908 B1 | 7/2001 | Love et al. |
| 6,288,472 B1 | 9/2001 | Cabuz et al. |
| 6,297,640 B1 | 10/2001 | Hayes |
| 6,321,781 B1 | 11/2001 | Kurth |
| 6,360,773 B1 | 3/2002 | Rhodes |
| 6,373,682 B1 | 4/2002 | Goodwin-Johansson |
| 6,386,234 B2 | 5/2002 | Sontag |
| 6,390,027 B1 | 5/2002 | Lyons et al. |
| 6,397,798 B1 | 6/2002 | Fiaccabrino |
| 6,401,753 B2 | 6/2002 | Neu |
| 6,418,793 B1 | 7/2002 | Pechoux et al. |
| 6,445,053 B1 | 9/2002 | Cho |
| 6,450,200 B1 | 9/2002 | Ollivier |
| 6,460,567 B1 | 10/2002 | Hansen, III et al. |
| 6,463,546 B1 | 10/2002 | Jeske et al. |
| 6,496,348 B2 | 12/2002 | McIntosh |
| 6,496,786 B1 | 12/2002 | Dieterle et al. |
| 6,505,838 B1 | 1/2003 | Cavaliere |
| 6,508,528 B2 | 1/2003 | Fujii et al. |
| 6,520,753 B1 | 2/2003 | Grosjean et al. |
| 6,533,574 B1 | 3/2003 | Pechoux |
| 6,536,287 B2 | 3/2003 | Beekhuizen et al. |
| 6,537,060 B2 | 3/2003 | Vegter |
| 6,547,554 B2 | 4/2003 | Koegl et al. |
| 6,550,495 B1 | 4/2003 | Schulze |
| 6,553,979 B2 | 4/2003 | Albright |
| 6,561,791 B1 | 5/2003 | Vrolijk et al. |
| 6,563,233 B1 | 5/2003 | Hinks |
| 6,564,824 B2 | 5/2003 | Lowery et al. |
| 6,571,817 B1 | 6/2003 | Bohan, Jr. |
| 6,572,077 B1 | 6/2003 | Worner |
| 6,579,087 B1 | 6/2003 | Vrolijk |
| 6,584,852 B2 | 7/2003 | Suzuki et al. |
| 6,590,267 B1 | 7/2003 | Goodwin-Johansson et al. |
| 6,606,911 B2 | 8/2003 | Akiyama et al. |
| 6,619,388 B2 | 9/2003 | Dietz et al. |
| 6,619,612 B2 | 9/2003 | Freisinger et al. |
| 6,623,012 B1 | 9/2003 | Perry et al. |
| 6,640,642 B1 | 11/2003 | Onose et al. |
| 6,644,351 B2 | 11/2003 | LaMarca et al. |
| 6,650,211 B2 | 11/2003 | Pimouguet |
| 6,651,506 B2 | 11/2003 | Lee et al. |
| 6,651,636 B1 | 11/2003 | Albright |
| 6,651,954 B1 | 11/2003 | Porcher et al. |
| 6,655,409 B1 | 12/2003 | Steenburgh et al. |
| 6,655,652 B2 | 12/2003 | Meinhof |
| 6,658,928 B1 | 12/2003 | Pollack et al. |
| 6,676,580 B2 | 1/2004 | Tsai et al. |
| 6,704,186 B2 | 3/2004 | Ishikura |
| 6,725,167 B2 | 4/2004 | Grumstrup et al. |
| 6,728,600 B1 | 4/2004 | Contaldo et al. |
| 6,729,601 B2 | 5/2004 | Freisinger et al. |
| 6,742,541 B2 | 6/2004 | Pimouguet |
| 6,768,406 B1 | 7/2004 | Fiaccabrino |
| 6,796,326 B2 | 9/2004 | Bayer |
| 6,813,954 B2 | 11/2004 | Gokhfeld |
| 6,814,102 B2 | 11/2004 | Hess et al. |
| 6,814,339 B2 | 11/2004 | Berger et al. |
| 6,819,208 B1 | 11/2004 | Peghaire et al. |
| 6,820,650 B2 | 11/2004 | Solet et al. |
| 6,825,632 B2 | 11/2004 | Hahn et al. |

(56) References Cited

U.S. PATENT DOCUMENTS

| | | |
|---|---|---|
| 6,826,947 B2 | 12/2004 | Solet et al. |
| 6,851,298 B2 | 2/2005 | Miura et al. |
| 6,874,367 B2 | 4/2005 | Jakobsen |
| 6,877,380 B2 | 4/2005 | Lewis |
| 6,877,383 B2 | 4/2005 | Horie et al. |
| 6,880,548 B2 | 4/2005 | Schultz et al. |
| 6,880,567 B2 | 4/2005 | Klaver et al. |
| 6,885,184 B1 | 4/2005 | Gofman |
| 6,888,354 B1 | 5/2005 | Gofman |
| 6,889,705 B2 | 5/2005 | Newman et al. |
| 6,892,756 B2 | 5/2005 | Schulze |
| 6,906,484 B1 | 6/2005 | Berroth et al. |
| 6,923,069 B1 | 8/2005 | Stewart |
| 6,956,340 B2 | 10/2005 | Schondelmaier et al. |
| 6,956,343 B2 | 10/2005 | Berroth et al. |
| 6,968,851 B2 | 11/2005 | Ramirez et al. |
| 6,981,426 B2 | 1/2006 | Wang et al. |
| 6,983,759 B2 | 1/2006 | Maichel et al. |
| 6,984,122 B2 | 1/2006 | Sullivan et al. |
| 6,994,308 B1 | 2/2006 | Wang et al. |
| 6,997,684 B2 | 2/2006 | Hahn et al. |
| 7,000,635 B2 | 2/2006 | Erbe et al. |
| 7,004,034 B2 | 2/2006 | Chen |
| 7,039,502 B2 | 5/2006 | Berwanger et al. |
| 7,066,203 B2 | 6/2006 | Baarda |
| 7,082,835 B2 | 8/2006 | Cook et al. |
| 7,089,086 B2 | 8/2006 | Schoonover |
| 7,089,959 B2 | 8/2006 | Cai |
| 7,093,611 B2 | 8/2006 | Murray et al. |
| 7,101,172 B2 | 9/2006 | Jaesschke |
| 7,107,820 B2 | 9/2006 | Nunnally et al. |
| 7,119,504 B2 | 10/2006 | Dornhof |
| 7,121,525 B2 | 10/2006 | Gelez |
| 7,174,771 B2 | 2/2007 | Cooper |
| 7,216,547 B1 | 5/2007 | Stewart et al. |
| 7,223,094 B2 | 5/2007 | Goebel |
| 7,225,056 B2 | 5/2007 | Bolduan et al. |
| 7,249,610 B2 | 7/2007 | Moses |
| 7,290,502 B2 | 11/2007 | Kidd et al. |
| 7,297,640 B2 | 11/2007 | Xie et al. |
| 7,302,863 B2 | 12/2007 | Kielb et al. |
| 7,319,300 B2 | 1/2008 | Hahn |
| 7,328,719 B2 | 2/2008 | Madden |
| 7,347,221 B2 | 3/2008 | Berger et al. |
| 7,360,751 B2 | 4/2008 | Herrfurth |
| 7,390,172 B2 | 6/2008 | Winkler |
| 7,402,925 B2 | 7/2008 | Best et al. |
| 7,405,609 B2 | 7/2008 | Krotsch |
| 7,422,028 B2 | 9/2008 | Nugent et al. |
| 7,451,600 B2 | 11/2008 | Patel et al. |
| 7,451,644 B2 | 11/2008 | Karte |
| 7,453,696 B2 | 11/2008 | Tungl et al. |
| 7,461,828 B2 | 12/2008 | Kidprasert |
| 7,493,822 B2 | 2/2009 | Stewart et al. |
| 7,503,221 B2 | 3/2009 | Wade |
| 7,504,961 B2 | 3/2009 | Flanders |
| 7,520,487 B2 | 4/2009 | Mattes |
| 7,537,019 B2 | 5/2009 | Ting et al. |
| 7,543,604 B2 | 6/2009 | Benda |
| 7,553,151 B2 | 6/2009 | O'Mara et al. |
| 7,556,238 B2 | 7/2009 | Seberger |
| 7,574,896 B1 | 8/2009 | Cooper |
| 7,586,228 B2 | 9/2009 | Best |
| 7,586,276 B2 | 9/2009 | Dornhoff |
| 7,624,755 B2 | 12/2009 | Benda et al. |
| 7,627,455 B2 | 12/2009 | Lenz et al. |
| 7,644,731 B2 | 1/2010 | Benda et al. |
| 7,647,940 B2 | 1/2010 | Minervini et al. |
| 7,669,461 B2 | 3/2010 | Kates |
| 7,688,011 B2 | 3/2010 | Berroth et al. |
| 7,715,168 B2 | 5/2010 | Gofman et al. |
| 7,735,509 B2 | 6/2010 | Galloway et al. |
| 7,740,024 B2 | 6/2010 | Brodeur et al. |
| 7,759,884 B2 | 7/2010 | Dufner et al. |
| 7,811,069 B2 | 10/2010 | Fleig |
| 7,812,488 B2 | 10/2010 | Cosco et al. |
| 7,816,813 B2 | 10/2010 | Yagudayev et al. |
| 7,841,541 B2 | 11/2010 | Ardelt et al. |
| 7,869,971 B2 | 1/2011 | Varga |
| 7,880,421 B2 | 2/2011 | Karwath |
| 7,880,427 B2 | 2/2011 | Foll et al. |
| 7,890,216 B2 | 2/2011 | Boger et al. |
| 7,890,276 B2 | 2/2011 | Killion et al. |
| 7,891,972 B2 | 2/2011 | Blank et al. |
| 7,898,372 B2 | 3/2011 | Melchionne, Jr. |
| 7,902,776 B2 | 3/2011 | Karwath |
| 7,905,251 B2 | 3/2011 | Flanders |
| 7,922,481 B2 | 4/2011 | Geiger et al. |
| 7,940,189 B2 | 5/2011 | Brown |
| 8,020,585 B2 | 9/2011 | Shock et al. |
| 8,036,837 B2 | 10/2011 | Wilke |
| 8,066,255 B2 | 11/2011 | Wang |
| 8,109,289 B2 | 2/2012 | Trnka et al. |
| 8,126,631 B2 | 2/2012 | Scalia, Jr. |
| 8,201,572 B2 | 6/2012 | Segal |
| 8,205,484 B2 | 6/2012 | Sasaki |
| 8,225,814 B2 | 7/2012 | Igarashi |
| 8,240,636 B2 | 8/2012 | Smith |
| 8,265,794 B2 | 9/2012 | Minervini et al. |
| 8,271,141 B2 | 9/2012 | Cummings et al. |
| 8,303,297 B2 | 11/2012 | Tompkins et al. |
| 8,307,845 B2 | 11/2012 | Kouchi et al. |
| 8,381,760 B2 | 2/2013 | Santinanavat et al. |
| 8,387,441 B2 | 3/2013 | Falta et al. |
| 8,424,563 B2 | 4/2013 | Haller et al. |
| 8,500,441 B2 * | 8/2013 | Geiger .................. F23N 5/022 431/12 |
| 8,601,957 B2 | 12/2013 | Conrads et al. |
| 8,639,464 B2 | 1/2014 | Artiuch et al. |
| 8,677,913 B2 | 3/2014 | Kastingschafer et al. |
| 8,706,381 B2 | 4/2014 | Donar et al. |
| 9,234,661 B2 | 1/2016 | Young et al. |
| 9,657,946 B2 | 5/2017 | Young et al. |
| 10,317,076 B2 * | 6/2019 | Super .................. F23N 5/184 |
| 10,422,531 B2 * | 9/2019 | Super .................. F23N 5/003 |
| 2002/0029808 A1 | 3/2002 | Friend et al. |
| 2002/0157713 A1 | 10/2002 | Pimouguet |
| 2002/0175791 A1 | 11/2002 | LaMarca et al. |
| 2003/0011136 A1 | 1/2003 | Ramirez et al. |
| 2003/0013054 A1 | 1/2003 | Fredricks et al. |
| 2003/0117098 A1 | 6/2003 | Berroth et al. |
| 2003/0150499 A1 | 8/2003 | Solet et al. |
| 2003/0167851 A1 | 9/2003 | Parker |
| 2003/0201414 A1 | 10/2003 | Freisinger et al. |
| 2004/0035211 A1 | 2/2004 | Pinto et al. |
| 2004/0129909 A1 | 7/2004 | Wiese |
| 2004/0214118 A1 | 10/2004 | Sullivan et al. |
| 2004/0263103 A1 | 12/2004 | Weisser et al. |
| 2005/0058961 A1 | 3/2005 | Moses |
| 2005/0166979 A1 | 8/2005 | Berger et al. |
| 2005/0199286 A1 | 9/2005 | Appleford et al. |
| 2005/0255418 A1 | 11/2005 | Goebel |
| 2005/0279956 A1 | 12/2005 | Berger et al. |
| 2006/0202572 A1 | 9/2006 | Tungl et al. |
| 2006/0226299 A1 | 10/2006 | Tungl et al. |
| 2006/0228237 A1 | 10/2006 | Winkler |
| 2006/0240370 A1 | 10/2006 | Neville et al. |
| 2006/0243334 A1 | 11/2006 | Brochhaus et al. |
| 2006/0260701 A1 | 11/2006 | Mattes |
| 2006/0272712 A1 | 12/2006 | Sontag |
| 2006/0278281 A1 | 12/2006 | Gynz-Rekowski et al. |
| 2007/0024225 A1 | 2/2007 | Hahn et al. |
| 2007/0068511 A1 | 3/2007 | Bachinsky et al. |
| 2007/0089789 A1 | 4/2007 | Mudd et al. |
| 2007/0095144 A1 | 5/2007 | Oboodi et al. |
| 2007/0164243 A1 | 7/2007 | Volz |
| 2007/0189739 A1 | 8/2007 | Dufner et al. |
| 2007/0241705 A1 | 10/2007 | Karwath |
| 2007/0256478 A1 | 11/2007 | Guadagnoia et al. |
| 2007/0257628 A1 | 11/2007 | Gofman et al. |
| 2007/0261618 A1 | 11/2007 | Kastingschafer et al. |
| 2008/0035456 A1 | 2/2008 | Melchionn, Jr. |
| 2008/0099082 A1 | 5/2008 | Moenkhaus |
| 2008/0156077 A1 | 7/2008 | Flanders et al. |

(56) References Cited

U.S. PATENT DOCUMENTS

| | | |
|---|---|---|
| 2008/0157707 A1 | 7/2008 | Jeske et al. |
| 2008/0297084 A1 | 12/2008 | Berroth et al. |
| 2008/0315807 A1 | 12/2008 | Loffler et al. |
| 2008/0318098 A1 | 12/2008 | Matsunaga |
| 2008/0318172 A1 | 12/2008 | Geiger et al. |
| 2009/0068503 A1 | 3/2009 | Yamazaki et al. |
| 2009/0111065 A1 | 4/2009 | Tompkins et al. |
| 2009/0120338 A1 | 5/2009 | Adendorff et al. |
| 2009/0126798 A1 | 5/2009 | Mather |
| 2009/0142717 A1 | 6/2009 | Lavelle |
| 2009/0146091 A1 | 6/2009 | Ams et al. |
| 2009/0148798 A1 | 6/2009 | Geiger et al. |
| 2009/0197212 A1 | 8/2009 | Masen |
| 2009/0240445 A1 | 9/2009 | Umekage et al. |
| 2009/0280989 A1 | 11/2009 | Astra et al. |
| 2009/0288399 A1 | 11/2009 | Fayard |
| 2009/0303076 A1 | 12/2009 | Setiadi et al. |
| 2010/0018324 A1 | 1/2010 | Killian et al. |
| 2010/0043896 A1 | 2/2010 | Shock et al. |
| 2010/0064818 A1 | 3/2010 | Shubert |
| 2010/0074777 A1 | 3/2010 | Laufer et al. |
| 2010/0102259 A1 | 4/2010 | Forster |
| 2010/0112500 A1 | 5/2010 | Maiello et al. |
| 2010/0146939 A1 | 6/2010 | Sim et al. |
| 2010/0180688 A1 | 7/2010 | Khemet et al. |
| 2010/0180882 A1 | 7/2010 | Oberhomburg et al. |
| 2010/0193045 A1 | 8/2010 | Xu |
| 2010/0254826 A1 | 10/2010 | Streng et al. |
| 2010/0269931 A1 | 10/2010 | Seebauer |
| 2010/0282988 A1 | 11/2010 | Kasprzyk et al. |
| 2010/0315027 A1 | 12/2010 | Wystup et al. |
| 2011/0025237 A1 | 2/2011 | Wystup et al. |
| 2011/0033808 A1 | 2/2011 | Geiger et al. |
| 2011/0039217 A1 | 2/2011 | Happe |
| 2011/0041483 A1 | 2/2011 | Kapparos |
| 2011/0046903 A1 | 2/2011 | Franklin |
| 2011/0080072 A1 | 4/2011 | Strobel et al. |
| 2011/0107826 A1 | 5/2011 | Wallis |
| 2011/0137579 A1 | 6/2011 | Seebauer |
| 2011/0212404 A1 | 9/2011 | Fan et al. |
| 2011/0240157 A1 | 10/2011 | Jones et al. |
| 2011/0266473 A1 | 11/2011 | Santinanavat et al. |
| 2011/0270544 A1 | 11/2011 | Kucera et al. |
| 2011/0284777 A1 | 11/2011 | Pitchford et al. |
| 2012/0107753 A1 | 5/2012 | Kemp |
| 2012/0148962 A1 | 6/2012 | Bernero et al. |
| 2012/0251960 A1 | 10/2012 | Newby et al. |
| 2013/0152673 A1 | 6/2013 | Young et al. |
| 2013/0153036 A1 | 6/2013 | Young et al. |
| 2013/0153041 A1 | 6/2013 | Kucera |
| 2013/0153042 A1 | 6/2013 | Young et al. |
| 2013/0153062 A1 | 6/2013 | Young et al. |
| 2013/0153798 A1 | 6/2013 | Kucera et al. |
| 2013/0154841 A1 | 6/2013 | Kucera et al. |
| 2013/0302738 A1 | 11/2013 | Rennie et al. |
| 2014/0080075 A1 | 3/2014 | Young et al. |
| 2014/0096850 A1 | 4/2014 | Filkovski et al. |
| 2015/0045971 A1 | 2/2015 | Endel et al. |
| 2015/0079526 A1 | 3/2015 | Lou et al. |
| 2015/0107675 A1 | 4/2015 | Kucera |
| 2016/0076767 A1 | 3/2016 | Super et al. |
| 2016/0123584 A1 | 5/2016 | Young et al. |
| 2017/0016752 A1 | 1/2017 | Speldrich et al. |
| 2017/0254536 A1* | 9/2017 | Super ............... G01G 1/36 |
| 2019/0293286 A1* | 9/2019 | Super ............... F23N 5/184 |

FOREIGN PATENT DOCUMENTS

| | | |
|---|---|---|
| DE | 19617852 | 10/1997 |
| DE | 19824521 | 12/1999 |
| DE | 102005033611 | 10/2006 |
| EP | 1571906 | 7/1980 |
| EP | 0062854 | 10/1982 |
| EP | 0062854 A1 * | 10/1982 ............ F23N 1/047 |
| EP | 0068517 | 1/1986 |
| EP | 0275439 | 7/1988 |
| EP | 0282758 | 9/1988 |
| EP | 0356690 | 5/1993 |
| EP | 0563787 | 10/1993 |
| EP | 0617234 | 9/1994 |
| EP | 0522479 | 5/1996 |
| EP | 0744821 | 11/1996 |
| EP | 0645562 | 12/1996 |
| EP | 0678178 | 12/1996 |
| EP | 0664422 | 4/1997 |
| EP | 0665396 | 1/1998 |
| EP | 0822376 | 2/1998 |
| EP | 0817931 | 12/1998 |
| EP | 0652501 | 3/1999 |
| EP | 0907052 | 4/1999 |
| EP | 0817934 | 5/1999 |
| EP | 0896192 | 10/1999 |
| EP | 0952357 | 10/1999 |
| EP | 0757200 | 4/2000 |
| EP | 1031792 | 8/2000 |
| EP | 1069357 | 1/2001 |
| EP | 0896191 | 2/2001 |
| EP | 1084358 | 3/2001 |
| EP | 0881435 | 9/2001 |
| EP | 1186779 | 3/2002 |
| EP | 0976957 | 4/2002 |
| EP | 1157205 | 9/2002 |
| EP | 1084369 | 1/2003 |
| EP | 1121511 | 4/2003 |
| EP | 0992658 | 5/2003 |
| EP | 1323966 | 7/2003 |
| EP | 1078187 | 8/2003 |
| EP | 1084357 | 8/2003 |
| EP | 1382907 | 1/2004 |
| EP | 1403885 | 3/2004 |
| EP | 1413045 | 4/2004 |
| EP | 1424708 | 6/2004 |
| EP | 1176317 | 8/2004 |
| EP | 1269054 | 8/2004 |
| EP | 1484509 | 12/2004 |
| EP | 1073192 | 1/2005 |
| EP | 1191676 | 1/2005 |
| EP | 1275039 | 1/2005 |
| EP | 1499008 | 1/2005 |
| EP | 1446607 | 3/2005 |
| EP | 1510756 | 3/2005 |
| EP | 1299665 | 4/2005 |
| EP | 1324496 | 6/2005 |
| EP | 1535388 | 6/2005 |
| EP | 1584870 | 10/2005 |
| EP | 1243857 | 12/2005 |
| EP | 1282798 | 12/2005 |
| EP | 0843287 | 2/2006 |
| EP | 1346463 | 3/2006 |
| EP | 1659462 | 5/2006 |
| EP | 1703140 | 9/2006 |
| EP | 1703146 | 9/2006 |
| EP | 1183772 | 10/2006 |
| EP | 1303718 | 10/2006 |
| EP | 1314240 | 10/2006 |
| EP | 1256763 | 11/2006 |
| EP | 1727268 | 11/2006 |
| EP | 1559936 | 12/2006 |
| EP | 1748534 | 1/2007 |
| EP | 1748545 | 1/2007 |
| EP | 1327808 | 2/2007 |
| EP | 1329659 | 2/2007 |
| EP | 1291532 | 6/2007 |
| EP | 1610046 | 6/2007 |
| EP | 1592905 | 7/2007 |
| EP | 1610045 | 7/2007 |
| EP | 1727261 | 10/2007 |
| EP | 1860328 | 11/2007 |
| EP | 1882882 | 1/2008 |
| EP | 1626321 | 2/2008 |
| EP | 1848907 | 4/2008 |
| EP | 1936778 | 6/2008 |
| EP | 1536169 | 11/2008 |
| EP | 1298679 | 12/2008 |

(56) References Cited

FOREIGN PATENT DOCUMENTS

| | | |
|---|---|---|
| EP | 1714040 | 12/2008 |
| EP | 2014979 | 1/2009 |
| EP | 1669648 | 2/2009 |
| EP | 2048439 | 4/2009 |
| EP | 2107248 | 7/2009 |
| EP | 2093545 | 8/2009 |
| EP | 1715229 | 10/2009 |
| EP | 2116857 | 11/2009 |
| EP | 2119946 | 11/2009 |
| EP | 1370787 | 3/2010 |
| EP | 1413044 | 3/2010 |
| EP | 2164164 | 3/2010 |
| EP | 2177796 | 4/2010 |
| EP | 2178201 | 4/2010 |
| EP | 1970610 | 5/2010 |
| EP | 2197101 | 6/2010 |
| EP | 2068056 | 8/2010 |
| EP | 2212984 | 8/2010 |
| EP | 1712800 | 10/2010 |
| EP | 2118493 | 10/2010 |
| EP | 2242344 | 10/2010 |
| EP | 1715582 | 11/2010 |
| EP | 1675757 | 12/2010 |
| EP | 2267883 | 12/2010 |
| EP | 1703139 | 1/2011 |
| EP | 2286976 | 2/2011 |
| EP | 1596495 | 4/2011 |
| EP | 2306622 | 4/2011 |
| EP | 2010500 | 6/2011 |
| EP | 2113696 | 7/2011 |
| EP | 1230517 | 7/2013 |
| FR | 2609154 | 7/1988 |
| GB | 2099158 | 12/1982 |
| GB | 2327750 | 2/1999 |
| JP | 02-086258 | 3/1990 |
| JP | 05-219760 | 8/1993 |
| JP | 9061284 | 3/1997 |
| JP | 9184600 | 7/1997 |
| JP | 2004125809 | 4/2004 |
| JP | 2004309159 | 11/2004 |
| JP | 2008135922 | 6/2008 |
| JP | 2008286478 | 11/2008 |
| SU | 744877 | 6/1980 |
| WO | WO 87/05375 | 9/1987 |
| WO | WO 98/01709 | 1/1995 |
| WO | WO 96/27095 | 9/1996 |
| WO | WO 97/29538 | 8/1997 |
| WO | WO 99/24758 | 5/1999 |
| WO | WO 99/60292 | 11/1999 |
| WO | WO 99/64769 | 12/1999 |
| WO | WO 99/64770 | 12/1999 |
| WO | WO 00/28215 | 5/2000 |
| WO | WO 01/06179 | 1/2001 |
| WO | WO 01/33078 | 5/2001 |
| WO | WO 01/61226 | 8/2001 |
| WO | WO 01/73297 | 10/2001 |
| WO | WO 01/90617 | 11/2001 |
| WO | WO 02/04852 | 1/2002 |
| WO | WO 02/077502 | 10/2002 |
| WO | WO 02/084156 | 10/2002 |
| WO | WO 02/086365 | 10/2002 |
| WO | WO 02/086918 | 10/2002 |
| WO | WO 02/097840 | 12/2002 |
| WO | WO 2004/059830 | 7/2004 |
| WO | WO 2004/070245 | 8/2004 |
| WO | WO 2005/042313 | 3/2005 |
| WO | WO 2005/076455 | 8/2005 |
| WO | WO 2005/076456 | 8/2005 |
| WO | WO 2005/085652 | 9/2005 |
| WO | WO 2005/094150 | 10/2005 |
| WO | WO 2006/000366 | 1/2006 |
| WO | WO 2006/000367 | 1/2006 |
| WO | WO 2006/053816 | 3/2006 |
| WO | WO 2006/039956 | 4/2006 |
| WO | WO 2006/042635 | 4/2006 |
| WO | WO 2006/077069 | 7/2006 |
| WO | WO 2006/088367 | 8/2006 |
| WO | WO 2007/012419 | 2/2007 |
| WO | WO 2007/018876 | 2/2007 |
| WO | WO 2007/093312 | 8/2007 |
| WO | WO 2007/140927 | 12/2007 |
| WO | WO 2008/061575 | 3/2008 |
| WO | WO 2008/039061 | 4/2008 |
| WO | WO 2008/119404 | 10/2008 |
| WO | WO 2008/141911 | 11/2008 |
| WO | WO 2008/148401 | 12/2008 |
| WO | WO 2009/000481 | 12/2008 |
| WO | WO 2009/049694 | 4/2009 |
| WO | WO 2009/065815 | 5/2009 |
| WO | WO 2009/073510 | 6/2009 |
| WO | WO 2009/089857 | 7/2009 |
| WO | WO 2009/126020 | 10/2009 |
| WO | WO 2010/018192 | 2/2010 |
| WO | WO 2010/052137 | 5/2010 |
| WO | WO 2010/056111 | 5/2010 |
| WO | WO 2010/083877 | 7/2010 |
| WO | WO 2011/010274 | 1/2011 |
| WO | WO 2011/045776 | 4/2011 |
| WO | WO 2011/047895 | 4/2011 |
| WO | WO 2011/051002 | 5/2011 |
| WO | WO 2011/069805 | 6/2011 |
| WO | WO 2011/072888 | 6/2011 |
| WO | WO 2011/092011 | 8/2011 |
| WO | WO 2011/095928 | 8/2011 |
| WO | WO 2013/117516 | 8/2013 |

OTHER PUBLICATIONS

"EP_1243857_A1_M—Machine Translation.pdf", machine translation, EPO.org, Jul. 24, 2021. (Year: 2021).*
"EP_1536169_A1_M—Machine Translation.pdf", machine translation, EPO.org, Jul. 24, 2021. (Year: 2021).*
"Flexible, Compact and with a High Performance—the New Valvario, G. Kromschroder AG Launches it's New, Improved Series of Gas Fittings," Press Release, 2 pages, 2003.
"Large-Scale Linearization Circuit for Electrostatic Motors" IBM Technical Disclosure Bulletin, U.S. IBM Corporation, Bulletin, U.S. IBM Corporation, vol. 37, No. 10, pp. 563-564, Oct. 1, 1994.
Allianz Risk Consulting, "Safety Shutoff Valves for Fuel-Fired Heating Equipment," Tech Talk, vol. 1, 3 pages, Oct. 2012.
ASCO RedHat, "2-Way Normally Closed General Purpose & Watertight Enclosure Gas Shutoff Valves ¾" to 3" NPT, ⅔ Series 8214 (200)," 8 pages, prior to Dec. 15, 2011.
ASCO RedHat, "2-Way Normally Closed General Purpose & Watertight Enclosure Gas Shutoff Valves ¾" to 3" NPT, ⅔ Series 8214 (200) AH(E) V710(B)," 6 pages, prior to Dec. 15, 2011.
ASCO Valve, Inc., "8290 Series Angle Body Piston Valves, Introducing the All New 8290 Assembly Configurator," 12 pages, prior to Dec. 15, 2011.
ASCO, "2-Way Normally Closed V710(B) Valve Body Pipe Sizes ¾" to 3" NPT, Series V710(B)," 4 pages, prior to Dec. 15, 2011.
ASCO, "On/Off General Purpose & Watertight Hydramotor Actuator for Use with V710 Gas Valve Body, Series AH2E," 2 pages, prior to Dec. 15, 2011.
Athavale et al., "Coupled Electrostatics-Structures-Fluidic Simulations of A Bead Mesopump," Proceedings of the International Mechanical Engineers Congress & Exhibition, pp. 1-7, Oct. 1999.
Bertz et al., "Silicon Grooves With Sidewall Angles Down to 1° made By Dry Etching", pp. 331-339, prior to Dec. 29, 2004.
Bonne et al. "Actuation-Based Fuel Gas Microsensors", IGT Symposium on "Natural Gas Quality, Energy Measurement, Metering and Utilization Practices", 17 pages, Mar. 2001.
Branebjerg, "A New Electrostatic Actuator Providing Improved Stroke Length and Force." IEEE, pp. 6-11, Feb. 4-7, 1992.
Bustgens et al., "Micropump Manufactured by Thermoplastic Molding" IEEE, pp. 18-21, 1994.
Cabuz et al., "Factors Enhancing the Reliability of Touch-Mode Electrostatic Actuators," Sensors and Actuators 79, pp. 245-250, 2000.

(56) References Cited

OTHER PUBLICATIONS

Cabuz et al., "Mesoscopic Sampler Based on 3D Array of Electrostatically Activated Diaphragms," Proceedings of the 10th Int. Conf. On Solid-State Sensors and Actuators, Transducers 1999.
Cabuz et al., "The Dual Diaphragm Pump," 4 pages prior to Dec. 29, 2004.
Cabuz, "Dielectric Related Effects in Micromachined Electrostatic Actuators," IEEE, 1999 Conference on Electrical Insulation and Dielectric Phenomena, pp. 327-332, 1999.
Cabuz, "Electrical Phenomena at the Interface of Rolling-Contact, Electrostatic Actuators," 16 pages, prior to Dec. 29, 2004.
Cabuz, et al., "High Reliability Touch-Mode Electrostatic Actuators", Technical Digest of the Solid State Sensor and Actuator Workshop, Hilton Head, S.C., , pp. 296-299, Jun. 8-11, 1998.
Cabuz, "Tradeoffs in MEMS Materials," SPIE, vol. 2881, pp. 160-170, prior to Dec. 29, 2004.
Carlisle, "10 Tips on Valve-Proving Systems," Karl Dungs Inc., 5 pages, Aug. 1, 2002, printed May 23, 2012.
Communication of a Notice of Opposition for EP Application Serial No. EP12196398.7, dated Feb. 15, 2016.
European Search Report for EP Application No. 12196394.6 dated May 23, 2013.
European Search Report for EP Application No. 12196396.1 dated Jun. 11, 2013.
European Search Report for EP Application No. 12196398.7 dated Jun. 11, 2013.
Examination Report for EP Application No. 12196398.7, dated Apr. 11, 2014.
The European Search Report for EP Application No. 15184490.9 dated May 3, 2016.
CSA, "B149.3S1-07 Supplement No. 1 to CAN/CAS-B149.3-05 Code for the Field Approval of Fuel-Related Components on Appliances and Equipment," 40 pages, Jan. 2007.
Dungs Combustion Controls, "Double Solenoid Valve Combined Pressure Regulator and Safety Valves Servo Pressure Regulator, MBC—. . .—SE DN 65 DN 125," 8 pages, prior to Dec. 15, 2011.
Dungs Combustion Controls, "Double Solenoid Valve Combined Pressure Regulator and Safety Valves Infinitely Variable Operating Mode, MBC—. . .—VEF DN65-DN100," 8 pages, prior to Dec. 15, 2011.
Dungs Combustion Controls, "Double Solenoid Valve Control and Safety Combination Valve Servo Pressure Controller, DMV-SE 507/11-525/11," 8 pages, prior to Dec. 15, 2011.
Dungs Combustion Controls, "Double Solenoid Valve Regulator and Safety Combination Infinitely Variable Floating Operation, DMV-VEF 507-525," 8 pages, prior to Dec. 15, 2011.
Dungs Combustion Controls, "Gas/Air Ratio Control MB-VEF, DMV-VEF," 15 pages, prior to Dec. 15, 2011.
Dungs Combustion Controls, "GasMultiBloc Combined Regulator and Safety Shut-Off Valves Two-Stage Function, MB-ZRD(LE) 415-420 B01," pp. 1-6, prior to Dec. 15, 2011.
Dungs Combustion Controls, "GasMultiBloc Combined Regulator and Safety Valve Infinitely Variable Air/Gas Ratio Control Mode, MBC-300-VEF, MBC-700-VEF, MBC-1200-VEF," 8 pages, prior to Dec. 15, 2011.
Dungs Combustion Controls, "GasMultiBloc Combined Servo Pressure Regulator and Safety Shut-Off Valves, MBC-300-SE, MBC-700-SE, MBC-1200-SE, MBC-300-N, MBC-700-N," 8 pages, prior to Dec. 15, 2011.
Dungs Combustion Controls, "Pressure Regulator FRN Zero Pressure Regulator," 4 pages, prior to Dec. 15, 2011.
Dungs Combustion Controls, "Pressure Regulator FRS," 6 pages prior to Dec. 15, 2011.
Dungs Combustion Controls, "Pressure Regulator FRU Circulation Regulator," 4 pages, prior to Dec. 15, 2011.
Dungs Combustion Controls, "Pressure Switch for Gas, Air, Flue Gases and Combustion Products, GW 500 A4, Gw 500 A½" 6 pages, prior to Dec. 15, 2011.
Dungs Combustion Controls, "Program," 4 pages, prior to Dec. 15, 2011.
Dungs Combustion Controls, "Valve Testing System VPS 504 for Multiple Actuators," 12 pages, prior to Dec. 15, 2011.
Dungs Combustion Controls, "Valve Testing System VPS 508 for Multiple Actuators," 12 pages, prior to Dec. 15, 2011.
Freund et al., "A Chemically Diverse Conducting Polymer-Based 'Electronic Nose'", Proceedings of the National Academy of Sciences of the United States of America, vol. 92, No. 7, pp. 2652-2656, Mar. 28, 1995.
Halg, "On a Nonvolatile Memory Cell Based on Micro-Electro-Mechanics", IEEE pp. 172-176, 1990.
Honeywell Inc., "Hall Effect Sensing and Application," 126 pages, prior to Dec. 15, 2011.
Honeywell, "RM7800L1087; RM7840G1022,L1075,L1091; EC7840L1014 Relay Modules with Valve Proving," Installation Instructions, 32 pages, 2009.
Honeywell, "V4730C/V8730C/V4734C 1:1 Gas/Air Servo Regulated Gas Valves, Product Data," 16 pages, 2006.
Honeywell, "V4943 A/V8943 A On/Off Diaphragm Gas Valves, Product Data," 8 pages, Apr. 2009.
Honeywell, "V5055A-F Industrial Gas Valves, Product Data," 12 pages, Nov. 2012.
https://en.wikipedia.org/wiki/SCADA, "SCADA," 10 pages, printed Mar. 29, 2016.
Korte et al., "Smart Valve Positioners and Their Use in Safety Instrumented Systems," Industrial Valves, pp. 41-47, 2009.
Kromschroder, "Governor with Solenoid Valve VAD Air/Gas Ratio Control with Solenoid Valve VAG," 8 pages, prior to Dec. 15, 2011.
Kromschroder, "Governor with Solenoid Valve VAD Air/Gas Ratio Control with Solenoid Valve VAG," 24 pages, prior to Dec. 15, 2011.
Kromschroder, "Solenoid Valves for Gas VAS," 28, pages, prior to Dec. 15, 2011.
Kromschroder, "Solenoid Valves for Gas VAS," 8 pages, prior to Dec. 15, 2011.
Kromschroder, "Tightness Control TC," 8 pages, 2011.
Maxon Corporation, "Functional Testing of Maxon Shut-off Valves, Valve Technical Data," 3 pages, 2008.
Minami et al., "Fabrication of Distributed Electrostatic Micro Actuator (DEMA)," IEEE Journal of Microelectromechanical Systems, vol. 2, No. 3, pp. 121-127, Sep. 1993.
Ohnstein et al., "Micromachined Silicon Microvalve," IEEE, pp. 95-98, 1990.
Porex Technologies, brochure, 4 pages, prior to Dec. 29, 2004.
Response to Opposition for EP Application Serial No. EP12196398.7, filed Jul. 15, 2016.
Shikida et al., "Characteristics of an Electrostatically-Driven Gas Valve Under High Pressure Conditions," IEEE , pp. 235-240, 1994.
Shikida et al., "Electrostatically Driven Gas Valve With High Conductance," IEEE Journal of Microelectromechanical Systems, vol. 3, No. 2, pp. 76-80, Jun. 1994.
Shikida et al., "Fabrication of An S-Shaped Microactuator," IEEE Journal of Microelectromechanical Systems, vol. 6, No. 1, pp. 18-24, Mar. 1997.
Siemens Building Technologies, "Double Gas Valves VGD20 . . . , VGD40 . . . ," 12 pages, Aug. 5, 2002.
Siemens Building Technologies, Inc., "Siemens Technical Instructions Document No. 155-512P25VG . . . ," 12 pages, Aug. 11, 2005.
Siemens Building Technologies, Inc., "SKP . . . 15U . . . Gas Valve Actuator with Safety Shutoff Function," Document No. 155-751 SKP15 . . . U . . . , 5 pages, Jul. 1, 2005.
Siemens Building Technologies, Inc., "SKP25 . . . U . . . Air/Gas Ratio Controlling Gas Valve Actuator with Safety Shutoff Function," Technical Instructions Document No. 155-754, SKP25 . . . U, 9 pages, Jul. 1, 2005.
Siemens Building Technologies, Inc., "SKP25 . . . U . . . Pressure Regulating Gas Valve Actuator with Safety Shut-Off Function," Technical Instructions Document No. 155-752, SKP25 . . . U, 7 pages, Jul. 1, 2005.
Srinivasan et al., "Self-Assembled Fluorocarbon Films for Enhanced Stiction Reduction", IEEE Transducers, 1997 International Conference on Solid-State Sensors and Actuators, Chicago, pp. 1399-1402, Jun. 16-19, 1997.

(56) References Cited

OTHER PUBLICATIONS

Universal Metering, "SmartValve Wireless Shut-Off Valve," Universal Metering Ltd., 4 pages, prior to Mar. 12, 2013.
Wagner et al., "Bistable Microvalve with Pneumatically Coupled Membranes," IEEE, pp. 384-388, 1996.
Wilkerson, "Understanding Valve Actuatior Diagnostics," Control Engineering, vol. 56, No. 11, 4 pages, Nov. 2009.
www.combustion911.com/products/valve-proving-controls-tc-410.html, "Kromschroeder Valve Proving Controls TC410," 7 pages, prior to Dec. 15, 2011, printed May 23, 2012.
Yang et al., "Fluorescent Porous Polymer Films as TNT Chemosensors: Electronic and Structural Effects", J. Am. Chem. Soc., pp. 11864-11873, 1998.
Yang et al., "Porous Shape Persistent Fluorescent Polymer Films: An Approach to TNT Sensory Materials", J. Am. Chem. Soc., pp. 5321-5322, 1998.

\* cited by examiner

BURNER CONTROL SYSTEM

This application is a continuation of U.S. patent application Ser. No. 15/600,403, filed on May 19, 2017, which is a continuation-in-part of U.S. patent application Ser. No. 14/992,826, filed on Jan. 11, 2016, now U.S. Pat. No. 9,657,946, which is a continuation of U.S. patent application Ser. No. 13/621,175, filed on Sep. 15, 2012, now U.S. Pat. No. 9,234,661. U.S. patent application Ser. No. 14/992,826, filed on Jan. 11, 2016, is hereby incorporated by reference, all of which are incorporated by reference.

U.S. patent application Ser. No. 15/600,403, filed on May 19, 2017 is also a continuation-in-part of U.S. patent application Ser. No. 14/485,519, filed on Sep. 12, 2014, which is also incorporated by reference.

BACKGROUND

The present disclosure pertains to heating and particularly to burners. More particularly, the disclosure pertains to fuel and air mixture control of the burners.

SUMMARY

The disclosure reveals a burner control system for improving overall burner performance and efficiency. The system may determine fuel and air channel or manifold parameters. Determination of the parameters may be performed with one sensor (e.g., a differential pressure or flow sensor). A signal from the sensor may be used to control the parameters which in turn affect the amount of fuel and air to the burner via a controller. Parameter control of the fuel and air in their respective channels may result in accurate fuel and air ratio control of the fuel and air mixture to the burner. One or more flow restrictors in fuel and/or air channels may further improve accuracy of the fuel and air ratio of the mixture. Byproducts in the burner exhaust may also be monitored and reduced or increased depending on what the byproducts are, with control of the fuel and air ratio of the mixture for further optimization of the combustion in the burner. The system may be a combination of two systems, that is, incorporating a use of the pressure divider with the sensor as the core, and adding combustion feedback or gas/air temperature feedback or any other feedback to increase the accuracy, by fine-tuning the sensor's offset that one is regulating to.

DESCRIPTION

Figure 1:
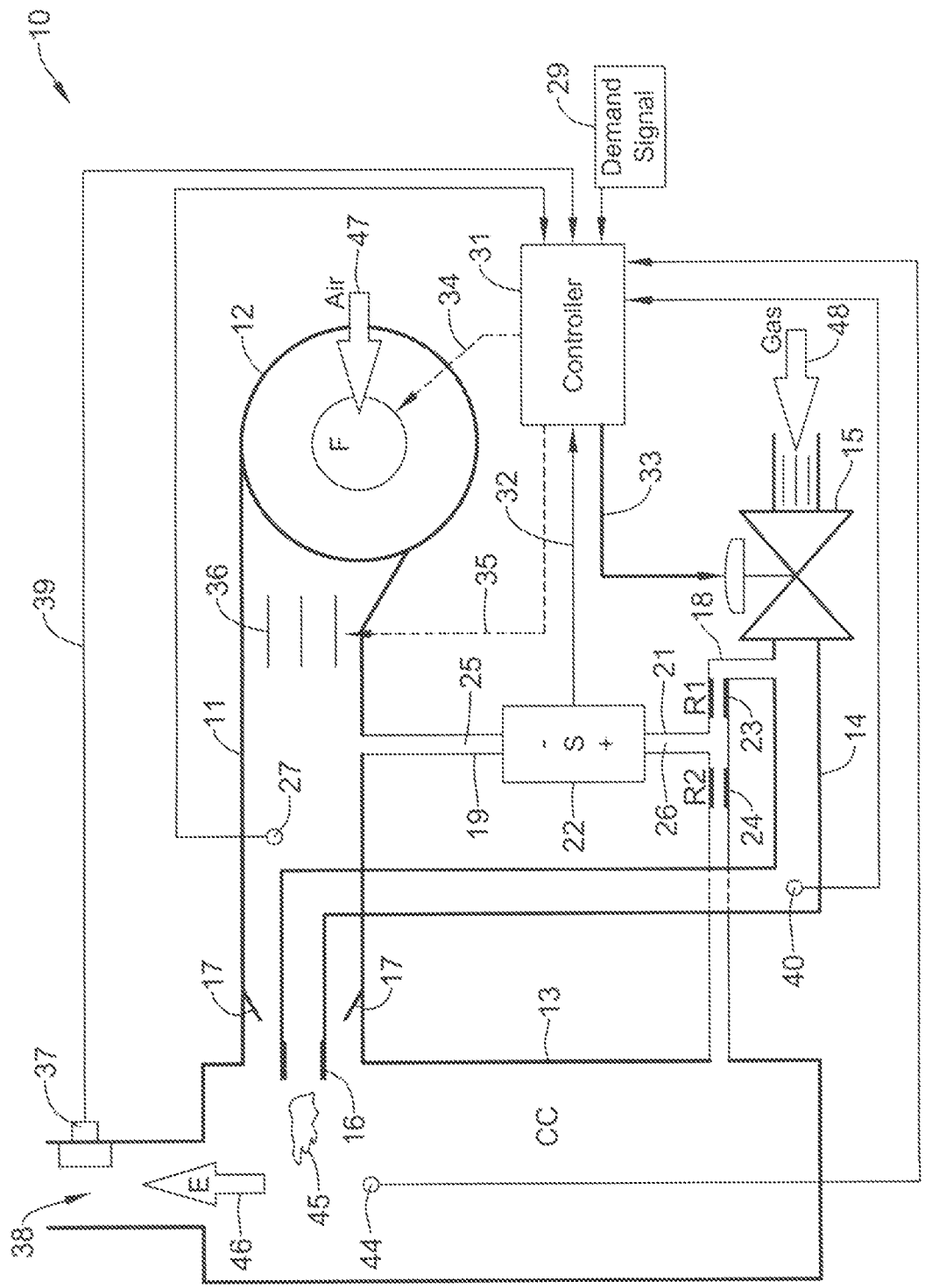
FIG. 1 is a diagram of a burner control system having a burner fuel and air mixture where a fuel parameter detected by the sensor is adjustable.

Precise control of the fuel/air ratio may be one of the most important aspects of improving overall burner performance and efficiency. Related art control systems appear to lack the accuracy, flexibility, and function/feature sets to take full advantage of modern day burner performance or to advance burner designs to the next level. Two of the most common control systems for controlling burners in the related art may be the parallel positioning system and the pneumatic gas-air system. Both have drawbacks.

The parallel positioning system may rely on precisely positioning two actuators (one on a fuel control valve, one on an air damper) along a known, predefined curve. A drawback to this system may be that the actual flow of gas and air is not necessarily being measured directly and that certain shifts (i.e., temperature change, upstream pressure regulator drift, obstructed air supply, and so forth) might go undetected and uncompensated. An advantage of the parallel positioning system appears to be that it is flexible. This system may be used to control any fuel/air ratio profile (e.g., non-linear) and do it precisely.

The pneumatic gas-air system may utilize pneumatic feedback signals from gas, air, and optionally from the combustion chamber to control the amount of fuel. Since this system may rely on the fluid parameters of the gas and air directly, it is not necessarily sensitive to certain components' shifting (e.g., upstream pressure regulator drift or obstructed air supply). A disadvantage may be that only two points of the system might be calibrated and the fuel/air (F/A) curve would be a linear approximation to what the burner really needs between the two points. Additionally, this type of system may be sensitive to, for example, pressure surges due to ignition and pressure instabilities around the pressure pick-up detection points for Pgas (gas pressure), Pair (air pressure), and Pcc (combustion chamber pressure).

A present system may combine the strengths of the related-art systems and eliminate virtually all of their weaknesses. A control system may measure the ratio of the gas and air manifold parameters. The system may combine the measurement of gas and air in such a way that a single sensor can be used to measure both fluids. Optionally, a second sensor may be added for safety through redundancy or to expand the measurement range of the system. The sensor feedback signal may replace, or be used in conjunction with, the position feedback of a parallel positioning system. Since the sensor may be coupled directly to the air and fuel supply, the system is no longer necessarily sensitive to certain failure modes (e.g., regulator drift or obstructed air supply). The system may also have the desired flexibility. Any fuel air curve may be programmed and stored in the controller, despite non-linearity. In essence, this system may have virtually all of the flexibility of a parallel positioning system, and virtually all of the inherent safety of a pneumatic gas air system.

The present burner control arrangement may be a component of a heating system or a component of a heating, ventilation and air conditioning (HVAC) system.

Additional features may be added to the baseline system to make it even more useful to the end user. The gas and air flow may be trimmed by the controller to account for variability in the air and gas temperatures (i.e., densities). This may be achieved by measuring/estimating the temperature of the fluids and adjusting the flow restrictions of air and/or gas, accordingly. For example, by keeping the air flow constant and only changing the gas flow, the burner load may be kept constant. The system may be further trimmed based on the chemical composition of the flue gas. This may be achieved by measuring the byproducts (i.e., NOx, CO, HC, O2, and so forth) of combustion and adjusting the flow restrictions of air and/or gas accordingly. These two measures may be combined to eliminate nearly all of the tolerances from burner performance design, and should enable the end user of the system to run at optimum combustion across a turn-down ratio of the appliance.

In a standard burner configuration where a fan may be used to inject air into the burner under pressure, there may be a manifold for gas and a manifold for air coming into the burner. A bypass channel may be connected to the gas supply downstream of the control valve, but upstream of the burner orifice and then to the combustion chamber. In this bypass channel, there may be two orifices (at least one should be adjustable, but both can be adjustable for added flexibility of the system). These two orifices in series may form a pneumatic circuit commonly referred to as a pressure divider. The purpose of this circuit may be to reduce the gas pressure in the bypass channel from the manifold pressure to some pressure closer in value to the air pressure. Between the two orifices of the pressure divider circuit there may be a coupling between the gas bypass channel and the air supply channel. This may be referred to as a measurement channel. In the measurement channel, there may be mass flow, differential pressure or gauge pressure sensors. The sensors may measure the direction and magnitude of the flow through the measurement channel or of the differential pressure or gauge pressure, and provide feedback to the system's controller. The system constituting the sensor, measurement channel, bypass channel, pressure divider, fuel control valve, and controller may all be located in a single body, or may all be individual items, or may be made up of any combination. Optionally, a combustion sensor may be added to the control system for increased ease of system setup and for improved control accuracy during operation. A sensor may be placed in the flue of the combustion chamber or other appropriate location to observe byproducts of combustion.

Another feature may be an addition of temperature sensing to measure the air and gas temperatures. If this information is available to the system controller, then the temperature (density) affecting the system mass flow may be compensated out. The temperature compensation may or may not involve separate temperature sensors since many readily available pressure and flow sensors can have built-in temperature measurement used for compensating temperature drifts of the sensor and/or compensation of the system to account for temperature related changes in the working fluids.

To set up the present system in the field, the burner may be adjusted between minimum and maximum fire and the combustion byproducts may be observed (either manually or by the controller itself if it has its own combustion sensor). The air flow and gas flow may be adjusted to a desired amount at each point on the fuel/air curve between minimum and maximum fire, and the output of the sensor in the measurement channel may be recorded and stored by the controller. This process may be repeated until the entire fuel/air curve has been profiled and stored. Once the controller has this curve, it may adjust the air damper, fan or the fuel valve precisely based on a desired firing rate of the system and feedback from the sensor in the measurement channel.

One way that the system could work may be as follows: 1) A combustion sensor senses a byproduct concentration and sends a signal to the controller; 2) the controller recalculates the "predetermined magnitude of the parameter" based on the present and the desired byproduct concentrations; and the controller sends a signal to a control mechanism or mechanisms, adjusting fuel and/or air such that the parameter is driven to the new predetermined magnitude.

A system, where the temperature of both air and fuel is monitored, may work as follows: 1) A controller determines a difference between air and fuel temperatures; 2) The controller recalculates the "predetermined magnitude of the parameter" based on the temperature difference; and 3) The controller sends a signal to control mechanism(s), adjusting fuel and/or air such that the parameter is driven to the new predetermined magnitude.

FIG. 1 is a diagram of a burner control system 10 having a burner fuel and air mixture where the fuel pressure within or flow through the bypass channel 18 is adjustable. System 10 may have an air supply channel 11 for pumping air 47 with a fan ("F") 12 at one end of channel 11 into a chamber 13, such as a combustion chamber ("CC"). At the other end of channel 11, there may be a baffle plate 17. Fuel 48, such as gas, may be injected downstream of baffle plate 17 into the airflow. Baffle plate 17 may be essential to make sure that the gas pressure is related to, for instance, the combustion chamber 13 pressure. This may assure that the gas flow goes down in case of a reduced air flow as a result of a flow blockage, e.g., in the flue.

Chamber 13 may be a volume where the one or more bypass channels terminate. Basically, the bypass channel or channels should terminate at a volume that has the same pressure as the termination points of the gas and air channels. Combustion chamber ("CC") may be regarded herein as an illustrative example of chamber 13. A fuel channel 14 may be connected to a valve 15 at one end and connected at another end to an orifice 16. A measurement channel 19 may connect one end of a sensor ("S") to air channel 11. A bypass channel 18 may have one end connected to fuel channel 14 and another end connected to combustion chamber ("CC") 13. A measurement channel 21 may connect another end of sensor 22 to bypass channel 18. A resistive orifice ("R1") 23 may be situated in bypass channel 18 between fuel channel 14 and measurement channel 21. Another resistive orifice ("R2") 24 may be situated in bypass channel 18 between measurement channel 21 and combustion chamber 13. Orifices 23 and 24 may constitute a pressure divider circuit. Orifice 23 may be varied when tuning burner system 10. Orifice 24 may be fixed but could also or instead be variable. An orifice may be variable, for example, in size, shape and/or other property.

Sensor 22 may be one or more flow sensors, one or more pressure sensors, one or more differential pressure sensors, and/or a manifold of similar or different sensors. The present examples in FIGS. 1-3 may utilize a differential pressure sensor for illustrative purposes, though the differential sensor may be substituted with other kinds of sensors such as a flow sensor or gauge pressure sensors. For instance, if sensor 22 is a flow sensor, then a flow may go from a channel that would have had been indicated by the differential pressure sensor as the channel to have a higher pressure, to the other channel indicated to have the lower pressure as indicated by the differential pressure sensor if it were situated in lieu of the flow sensor.

When tuning the burner system 10 for operation with nominal settings of air flow in channel 11 and fuel 48 in channel 14, orifice 23, may be adjusted in size to, for example, equalize the pressures or adjust them to predefined magnitudes in measurement channels 19 and 21, which may be designated as pressures 25 and 26, respectively. As a result, for equalization between ports 19 and 21 as a matter of course, there should be no flow through a flow sensor 22 or there should be a zero pressure difference indicated by a differential pressure sensor 22. The differential pressure, flow rate, gauge pressures, or other parameter value does not necessarily need to be zero or reflect similar magnitudes of parameters relating to the air and fuel channels. There may be a deviation or offset from zero as a setpoint referred to for control of the air pressure, gas pressure, flow, or other parameter. A sensor or sensors indicating a parameter comparison relative to the air and fuel channels may allow for a lambda adjustment as a function of the burner load and/or air flow. In lieu of zero, there may be a predefined differential pressure, gauge pressures, flow, or other parameter relative to the burner load, fuel consumption, air usage, fuel air mixture, and/or the like.

After burner system 10 is in place after being tuned and operating, for instance, pressures 25 and 26 may become different resulting in an indication by sensor 22 that the pressures are different either by a flow or differential pressure indication. A signal 32 of the indication of pressures 25 and 26 or other parameters may go to a controller 31. In response to the difference in pressures 25 and 26, controller 31 may send a signal 33 to valve 15. Valve 15 may be motorized in that it may open or close incrementally according to signal 33. For example, if pressure 25 is greater than pressure 26, then via signals 32 and 33 to and from controller 31, respectively, valve 15 may open to increase the fuel pressure in channels 14 and 18, and thus pressure 26 until it is about equal to pressure 25 if that is the goal, or some predefined differential pressure. If pressure 25 is less than pressure 26, then via signals 32 and 33 to and from controller 31, respectively, valve 15 may close to decrease the fuel pressure in channels 14 and 18, and thus, for example, pressure 26 until it is about equal to pressure 25 if that is the goal, or some predefined differential pressure.

Controller 31 may be connected to fan 12 which may be varied in speed according to a signal 34 from controller 31 and thus vary flow of air 47 through channel 11. Changing speed of fan 12 may increase or decrease pressure 25 to make it equal to pressure 26, or result in a predetermined differential pressure between pressures 25 and 26, or some other parameter such as a flow rate, indicated by sensor 22 via signals 32 and 34 to and from controller 31, respectively.

Controller 31 may be connected to a motorized damper/louver 36 which may vary closure or opening of channel 11 to affect an amount of air flow through channel 11 according to a signal 35 from controller 31 and thus vary the flow of air 47 through channel 11. Opening or closing damper/louver 36 may increase or decrease pressure 25 to make it equal to pressure 26, or to result in a predetermined differential pressure between pressures 25 and 26, as indicated by sensor 22 via signals 32 and 35 to and from controller 31, respectively.

Pressures 25 and 26 may also be equalized or differentiated to a predetermined value, with a combination of two or more kinds of control which incorporate control of valve 15, control of fan 12 and/or control of damper 36, via signals 33, 34 and 35, respectively, from controller 31 according to signal 32 from sensor 22. In a basic form, the present system pressures 25 and 26, or a flow rate between channels 19 and 21, may be adjusted to some value through control over the fuel 48, such as, for instance, gas.

Figure 2:
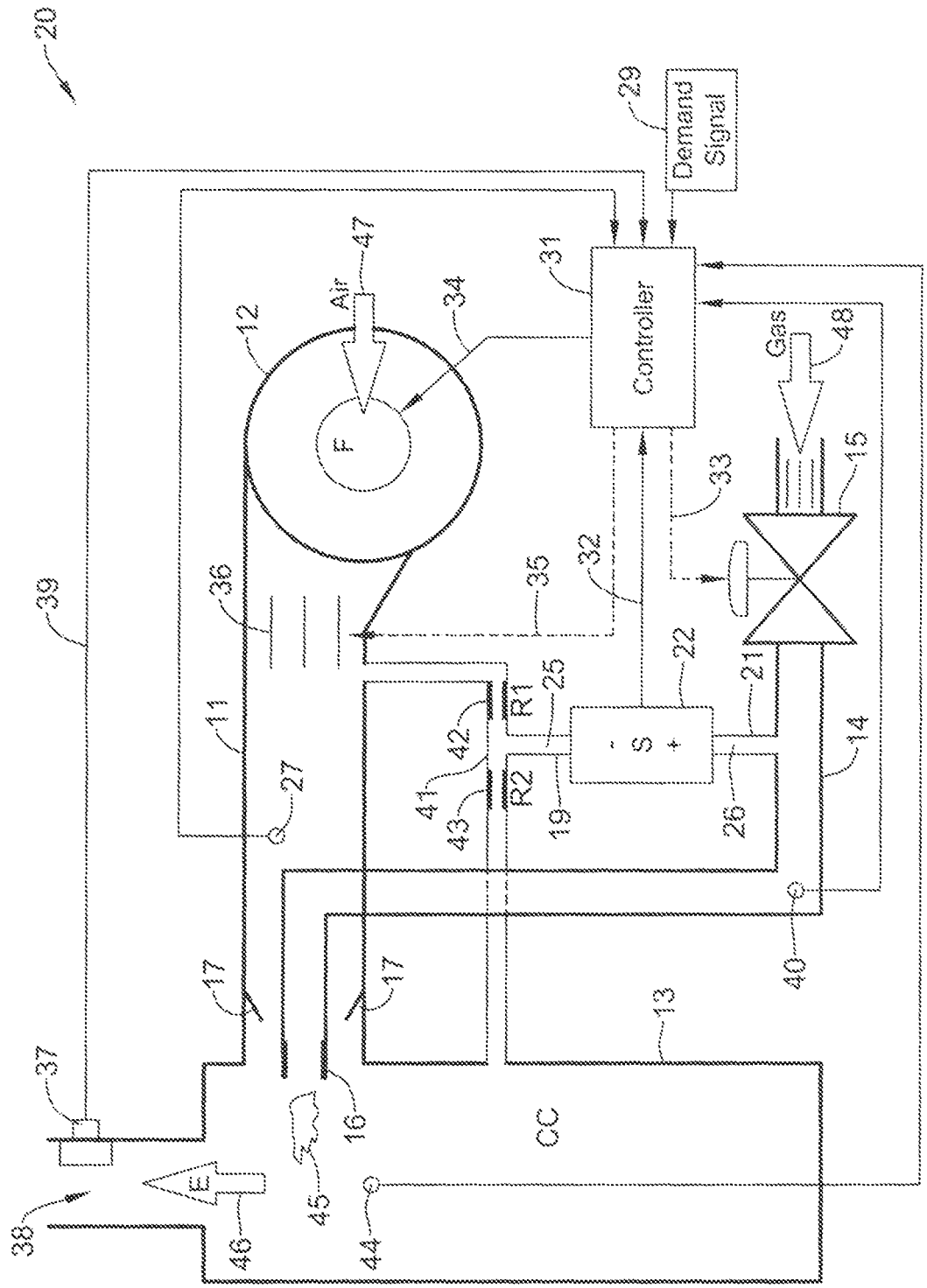
FIG. 2 is a diagram of a burner control system having a burner fuel and air mixture where an air parameter detected by the sensor is adjustable.
Figure 3:
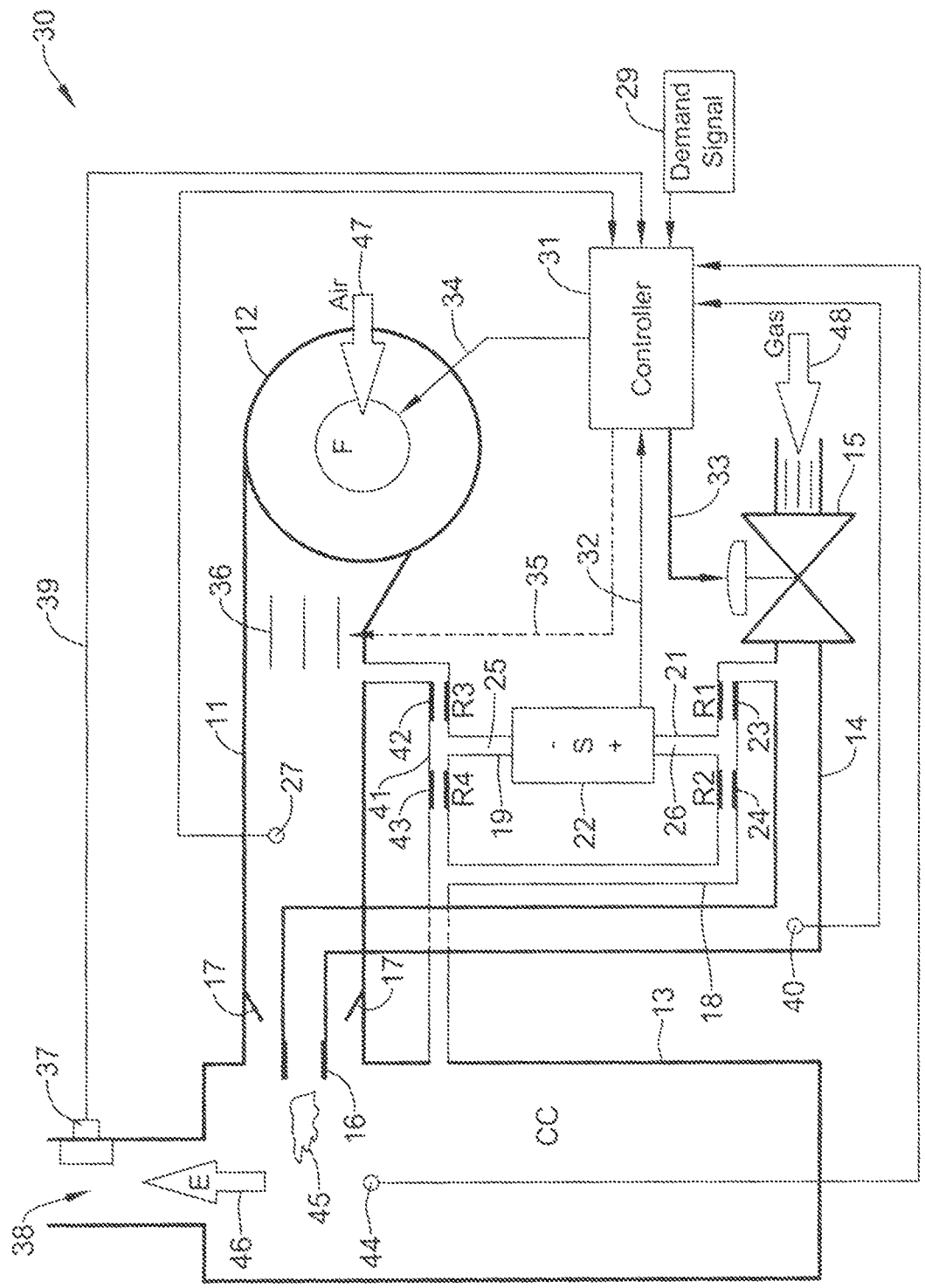
FIG. 3 is a diagram of a burner control system having a burner fuel and air mixture where both the air and fuel parameters detected across the sensor are adjustable.

Air temperature may be detected by a sensor 27 in air channel 11 and provided as a signal to controller 31 of systems 10, 20 and 30 of FIGS. 1, 2 and 3, respectively. Fuel temperature may be detected by sensor 40 in fuel channel 14 and provided as a signal to controller 31 of systems 10, 20 and 30. Instead, temperature sensing of the air 47 and/or fuel 48 may be a built-in part of primary control of the air and/or fuel, respectively. Controller 31 may compensate for densities of air 47 and fuel 48 in a fuel air ratio control. Sensors 27 and 40 may be a combination of temperature and pressure sensors.

A demand signal 29 may also go to controller 31 in systems 10, 20 and 30. Signal 29 may be regarded as a load control signal. A predefined pressure drop or offset, or flow rate across sensor 22 may be nearly instantaneously set by controller 31 through adjusting fuel valve 15 via line 33 and/or manipulating the air supply with a mechanism such as, for example, fan 12 or damper/louver 36 via lines 34 and 35, respectively, from controller 31. The pressure offset or flow across sensor 22 may be induced as a function of a demand signal 29. Demand signal 29 may effectively tell system 10, 20 or 30, what a firing rate should be, taking into account that a desired fuel air ratio may be different at different firing rates.

Any of systems 10, 20 and 30, may be used with virtually any control scheme such as controlling fuel 48 or air 47 only, controlling both fuel 48 and air 47, controlling both fuel and air with a combustion byproduct sensor to offset the system, controlling both the fuel and air with the combustion byproduct sensor 37, and so on. A combustion sensor 37 may be mounted at an exhaust port 38 of combustion chamber 13 to provide a signal 39, indicating information about byproducts in exhaust gases ("E") 46 emanating from a flame 45 at orifice 16 in combustion chamber 13 for systems 10, 20 and 30. Byproducts of combustion in the burner exhaust, temperatures of the gas and air, and/or flame quality may be monitored and adjusted with control of the fuel and air ratio for optimum combustion in the burner. A quality of flame 45 may be inferred from information about byproducts and/or other information such as parameters relative to pressure, temperature, flow and so forth. A specific flame quality sensor (not shown) may be incorporated. Signal 39 may go to controller 31, which can adjust pressures 25 and/or 26 or flow rate to change an amount of certain byproducts in exhaust gases 46. Sensor 37 may also or instead be a temperature sensor of exhaust gases 46. There may also be a sensor 44 situated in chamber 13 and connected to controller 31. Sensor 44 may be a pressure sensor, or a temperature sensor, or both a pressure and temperature sensor. A basic form of the system may incorporate a pressure divider on the fuel (restrictors 23 and 24) or air side (restrictors 42 and 43), sensor 22, valve 15 and controller 31 that takes signal 32 from sensor 22 and drives valve 15 with signal 33. The system does not necessarily control air 47 but rather the system may simply follow an air signal that the system is given. A flame sensor monitor may be added to the present system. The sensor may be a flame rod, optical sensor, and so on, that can monitor the combustion process and be used to offset the fuel air ratio.

FIG. 2 is a diagram of a burner control system 20 having a burner fuel and air mixture where the air pressure across the sensor is adjustable. System 20 may have some components similar to those of system 10 shown in FIG. 1. In system 20, a first port of sensor ("S") 22 may be connected directly to fuel channel 14 through measurement channel 21, since bypass channel 18 of system 10 is absent. A second port of sensor ("S") 22 may be connected through measurement channel 19 to a bypass channel 41 that has a one end coupled to air channel 11 and another end coupled to combustion chamber ("CC") 13. A restrictive orifice ("R1") 42 may be situated in bypass channel 41 between the end of the bypass channel 41 coupled to air channel 11 and measurement channel 19. A second resistive orifice ("R2") 43 may be situated in bypass channel 41 between the measurement channel 19 and the end of bypass channel 41 that is coupled to combustion chamber ("CC") 13. One or both orifices 42 and 43 may be variable, for instance, in size, shape and/or other property. Pressures 25 and 26 at ports 19 and 21, respectively, may be equalized initially by adjusting a passage size of one or both orifices 42 and 43, and then possibly be set to a predefined differential value of pressures 25 and 26 indicated by a pressure sensor 22, or a flow rate between ports 19 and 21 of a flow sensor 22. A variable passage may equal a bypass channel plus one or more restrictors. In operation further on in time, pressures 25 and 26 may be equalized or set to the predefined value by control of air flow in channel 11 by control of fan or air mover 12 with a signal 34 from controller 31 as guided by signal 32 indicating the differential pressure of pressures 25 and 26 or flow rate across sensor ("S") 22. Air flow in channel 11 may also be affected by damper or louver 36 with a signal 35 from controller 31 as guided by signal 32 from sensor ("S") 22. The differential of pressures 25 and 26, or flow rate between measurement channels 19 and 21, may also be affected by fuel flow in channel 14 as controlled by valve 15 with a signal 33 from controller 31 as guided by signal 32 from sensor 22. Control of the differential pressure or the flow rate may be effected by valve 15 control, air mover 12 control or damper/louver 36 control, or any combination of these controls. A basic system may utilize just the valve 15 control. Sensor 22 may detect or measure values or magnitudes of other parameters relative to channels 11 and 14.

FIG. 3 is a diagram of a burner system 30 having a burner fuel and air mixture where the air and fuel pressures or flow rate across sensor 22 may be adjustable. System 30 may have some components similar to those of systems 10 and 20 shown in FIGS. 1 and 2, respectively. Bypass channel 41 with restrictive orifice ("R3") 42 and restrictive orifice ("R4") 43 may be coupled at one end to air channel 11 and coupled at the other end to combustion chamber 13. A first port of sensor ("S") 22 may be coupled to bypass channel 41 between orifices 42 and 43 via measurement channel 19. A second port of sensor ("S") 22 may be coupled to bypass channel 18 between orifices ("R1") 23 and ("R2") 24 via measurement channel 21. Bypass channel 18 with orifices ("R1") 23 and ("R2") 24 may be coupled at one end to fuel channel 14 and coupled at the other end to bypass channel 41 between orifice ("R4") 43 and the end of channel 41 connected to combustion chamber 13. Instead of to channel 41, bypass channel 18 may have the other end coupled directly to chamber 13. At least one or more of orifices 23, 24, 42 and 43 may have an adjustable passage size, shape or other property. By adjusting the orifices in the bypass channels the gas flow may be adjusted in order to meet a desired lambda (excess air) setting of the application, and thus adjust the amplification factor between the air and gas pressures in the air channel 11 and fuel channel 14, or flow rate between channels 11 and 14 across sensor 22, respectively.

In operation further on in time, pressures 25 and 26 may be equalized or made to meet a desired differential pressure by control of air flow in channel 11 by control of fan or air mover 12 with a signal 34 from controller 31 as guided by signal 32 indicating the differential pressure of pressures 25 and 26 across sensor 22. Instead of the differential value of pressures 25 and 26, another parameter such as flow rate, may be measured across sensor 22. Air flow in channel 11 may also be affected by damper or louver 36 with a signal 35 from controller 31 as guided by signal 32 from sensor 22. The differential of pressures 25 and 26 or flow rate as indicated by sensor 22 may also be affected by fuel flow in channel 14 as controlled by valve 15 with a signal 33 from controller 31 as guided by signal 32 from sensor 22. Control of the differential pressure or flow rate may be effected by valve 15 control, air mover 12 control or damper/louver 36 control, or any combination of these controls. A measurement of gauge pressures at both ends of or across sensor 22, or flow rate may be measured through sensor 22 that is to provide a signal 32 to controller 31 and in turn the controller to provide the respective control signals for regulating air and fuel flow through the respective channels 11 and 14.

To recap, a burner control system for heating, ventilating and air conditioning (HVAC) may incorporate an air channel having an output coupled to a chamber, a fuel channel having an output coupled to the chamber, an air mover coupled to the air channel, a fuel valve coupled to an input of the fuel channel, a first bypass channel having a first end coupled to the air channel and having a second end coupled to the chamber, a second bypass channel having a first end coupled to the fuel channel and a second end coupled to the first bypass channel or the chamber, a sensor having a first port connected to the first bypass channel and having a second port connected to the second bypass channel, and a controller connected to the sensor. The sensor may detect a parameter between the first port of the sensor and the second port of the sensor. The sensor may provide a signal, indicating a magnitude of the parameter, to the controller. The controller may send a signal to a control mechanism to adjust an amount of fuel to the fuel channel and/or to adjust a quantity of air to the air channel, so as to cause the parameter to approach a predetermined magnitude for achieving a certain fuel air ratio of a fuel air mixture to the chamber. The parameter may be selected from a group consisting of a flow rate, differential pressure and gauge pressures.

There may also be a sensor, situated in the chamber and connected to the controller, for detecting a quality of a flame resulting from the fuel air mixture in the chamber. The quality of the flame may be used to achieve or adjust a ratio of the fuel air mixture.

The system may further incorporate a first restrictor orifice situated in the second bypass channel between the first end of the second bypass channel and the second port of the sensor, and a second restrictor orifice situated in the second bypass channel between the second port of the sensor and the second end of the second bypass channel.

The system may also further incorporate a third restrictor orifice situated in the first bypass channel between the first end of the first bypass channel and the first port of the sensor, and a fourth restrictor orifice situated in the first bypass channel between the first port of the sensor and second end of the second bypass channel coupled to the first bypass channel or the chamber.

One or more restrictor orifices may have a variable orifice size. The variable orifice size may be varied to make the parameter approach the predetermined magnitude.

The control mechanism may be the fuel valve that adjusts the amount of fuel to the fuel channel so as to cause the parameter to approach the predetermined magnitude. The control mechanism may be an air mover that adjusts the quantity of air to the air channel so as to cause the parameter to approach the predetermined magnitude.

The system may further incorporate a variable damper/louver situated in the air channel. The control mechanism may be the variable damper/louver that adjusts the quantity of air to the air channel so as to cause the parameter to approach the predetermined magnitude.

The sensor may be an item consisting of one or more sensors and is selected from a group consisting of one or more pressure sensors, differential pressure sensors, and flow sensors.

The system may further incorporate a combustion sensor situated at an exhaust port of the chamber. The combustion sensor may provide a signal, indicative of a concentration of one or more combustion byproducts, to the controller. The controller may calculate a predetermined magnitude of the parameter based on the concentration and desired concentration of the one or more combustion byproducts. The controller may send a signal to the control mechanism to adjust the amount of fuel to the fuel channel and/or to adjust the quantity of air to the air channel so as to drive the parameter to a new predetermined magnitude.

The system may further incorporate a temperature sensor situated in a fuel channel and/or air channel. The temperature sensor may provide a signal, indicative of a temperature of fuel and/or air, to the controller. The controller may calculate a predetermined magnitude of the parameter based on the temperature of the fuel and/or air. The controller may send a signal to the control mechanism to adjust the amount of fuel to the fuel channel and/or to adjust the quantity of air to the air channel so as to drive the parameter to a new predetermined magnitude.

Another burner control system may incorporate a chamber, an air channel having an output coupled to the chamber, a fuel channel having an output coupled to the chamber, an air mover coupled to the air channel, a fuel valve coupled to an input of the fuel channel, a bypass channel having a first end coupled to the fuel channel and having a second end coupled to the chamber, a sensor having a first port coupled to the air channel and having a second port coupled to the bypass channel, and a controller connected to the sensor and to the valve or the air mover.

A difference between a first parameter at the first port of the sensor and a second parameter at the second port of the sensor may be detected by the sensor.

The system may further incorporate one or more restrictors situated in the bypass channel. At least one restrictor of the one or more restrictors may have a variable flow restriction. A variable passage may incorporate a bypass channel and one or more restrictions. The variable passage may be tuned so that a difference of magnitudes of the first parameter and the second parameter approaches a magnitude to obtain a predetermined fuel air mixture during operation of the burner system.

If the difference of magnitudes of the first and second parameters is greater or less than a predetermined magnitude by a given delta of magnitude, a signal from the sensor to the controller may indicate the difference of the first and second parameters, and the controller may provide a signal to the valve to close or open the valve to decrease or increase fuel flow in the fuel channel or to the air mover to decrease or increase air flow and change the difference between the first and second parameters to approach the predetermined magnitude.

A predetermined magnitude of the difference between the first and second parameters may be needed to obtain a correct fuel air mixture. if the first parameter needs to be greater than the second parameter to approach the predetermined magnitude of the difference between the first and second parameters, then the controller may provide a signal to adjust the valve to change an amount of fuel entering the fuel channel or to adjust the air mover to change an amount of air entering the air channel which decreases the second parameter or increases the first parameter. If the second parameter needs to be greater than the first parameter to approach the predetermined magnitude of the difference between the first and second parameters, then the controller may provide a signal to the valve to change an amount of fuel entering the fuel channel or to adjust the air mover to change an amount of air entering the air channel which increases the second parameter or decreases the first parameter.

The following may be stated as an alternative to the previous paragraph. If the difference between the first and the second parameter needs to be increased to approach the predetermined magnitude of the difference between the first and second parameters, then the controller may provide a signal to adjust the valve to decrease an amount of fuel entering the fuel channel and/or to adjust the air mover to increase an amount of air entering the air channel which decreases the second parameter and/or increases the first parameter, respectively. If the difference between the first and the second parameter needs to be decreased to approach the predetermined magnitude of the difference between the first and second parameters, then the controller may provide a signal to adjust the valve to increase an amount of fuel entering the fuel channel and/or to adjust the air mover to decrease an amount of air entering the air channel which increases the second parameter and/or decreases the first parameter, respectively.

Still another burner system may incorporate an air channel having an output coupled to a combustion chamber, a fuel channel having an output coupled to the chamber, an air flow control mechanism coupled to the air channel, a fuel valve coupled to an input of the fuel channel, a bypass channel having a first end coupled to the air channel and having a second end coupled to the chamber, and a sensor having a first port coupled to the bypass channel and a second port coupled to the fuel channel.

The system may further incorporate a controller having an input connected to an output of the sensor. A difference between a first parameter at the first port of the sensor and a second parameter at the second port of the sensor may be detected by the sensor and indicated by the sensor on a signal to the controller. The system may still further incorporate one or more restrictors situated in the bypass channel. At least one restrictor of the one or more restrictors may have a variable flow restriction.

A predetermined magnitude of the difference between the first and second parameters may be needed to obtain a correct fuel air mixture. If the second parameter needs to be more than the first parameter to approach the predetermined magnitude of the difference between the first and second parameters, then the controller may provide a signal to the air flow control mechanism to adjust an amount of air going through the air channel or to the valve to adjust an amount of fuel going through the fuel channel which decreases the first parameter or increases the second parameter. If the first parameter needs to be greater than the second parameter to approach the predetermined magnitude of the difference between the first and second parameters, then the controller may provide a signal to the air flow control mechanism to adjust the amount of air going through the air channel or to the valve to adjust the amount of fuel going through the fuel channel which increases the first parameter or decreases the second parameter.

The system may further incorporate a second sensor connected to the controller and situated in the chamber. The second sensor may detect a quality of a flame in the chamber. The quality of the flame may be conveyed via a signal to the controller for calculating a fuel air mixture for optimizing the quality of the flame in the chamber. The fuel air mixture may be attained by signals from the controller to the air flow control mechanism and/or to the fuel valve. Optimizing the quality of the flame may incorporate reducing or increasing the byproducts in an exhaust of the chamber, increasing or decreasing an amount of heat per unit of fuel used, and/or achieving other beneficial results relative to energy, environment, efficiency, and/or the like.

In the present specification, some of the matter may be of a hypothetical or prophetic nature although stated in another manner or tense.

Although the present system and/or approach has been described with respect to at least one illustrative example, many variations and modifications will become apparent to those skilled in the art upon reading the specification. It is therefore the intention that the appended claims be interpreted as broadly as possible in view of the related art to include all such variations and modifications.

What is claimed is:

1. A method for compensating for mass air flow provided to a burner, the method comprising:
    providing a flow of air to a combustion chamber of the burner via an air supply channel;
    providing a flow of gas to the combustion chamber of the burner via a fuel channel that extends from a gas valve to the combustion chamber;
    using a sensor to sense a measure related to a flow and/or a pressure, in a measurement channel, wherein the measurement channel is fluidly coupled between the air supply channel and a fuel bypass channel, wherein the fuel bypass channel extends from the fuel channel downstream of the gas valve and provides a bypass flow of fuel that bypasses at least part of the fuel channel before being ultimately delivered to the combustion chamber; and
    adjusting the flow of gas to the combustion chamber via the gas valve based at least in part on the measure related to the flow and/or pressure in the measurement channel.

2. The method of claim 1, wherein the gas valve is housed by a gas valve body, and wherein the sensor, at least part of the fuel bypass channel and at least part of the measurement channel are housed by the gas valve body, and wherein the sensor is a mass flow sensor for sensing a measure of mass flow through the measurement channel.

3. The method of claim 1, wherein the measurement channel is fluidly coupled between the fuel bypass channel and an air bypass channel, wherein the air bypass channel extends from the air supply channel and provides a bypass flow of air that bypasses at least part of the air supply channel before being ultimately delivered to the combustion chamber.

4. The method of claim 1, wherein the method compensates for one or more of: changes in mass air flow in the flow of air in the air supply channel caused by a blocked or partially blocked exhaust flue connected to the combustion chamber of the burner system; changes in mass air flow in the flow of air in the air supply channel caused by changes in air density; and/or changes in mass air flow in the flow of air in the air supply channel caused by changes in pressure of the air that is provided to the combustion chamber.

5. The method of claim 1, wherein the fuel bypass channel includes a first restrictor and a second restrictor that create a pressure divider, wherein the measurement channel is fluidly coupled to the fuel bypass channel between the first restrictor and the second restrictor.

6. The method of claim 1, comprising adjusting the flow of air in the air supply channel based at least in part on the measure related to flow and/or pressure in the measurement channel.

7. The method of claim 6, wherein the flow of air in the air supply channel is adjusted by adjusting a speed of a fan that provides the flow of air to the combustion chamber.

8. The method of claim 6, wherein the flow of air in the air supply channel is adjusted by adjusting a damper that varies a closure or opening of an air flow to the air supply channel.

9. A method for compensating for mass air flow provided to a burner, the method comprising:
    providing a flow of air to a combustion chamber of the burner via an air supply channel;
    providing a flow of gas to the combustion chamber of a burner via a fuel channel that extends from a gas valve to the combustion chamber;
    using a sensor to sense to a measure related to a flow and/or a pressure in a measurement channel, wherein the measurement channel is fluidly coupled between the fuel channel and an air bypass channel, wherein the air bypass channel extends from the air supply channel and provides a bypass flow of air that bypasses at least part of the air supply channel before being ultimately delivered to the combustion chamber; and
    adjusting the flow of air and/or the flow of gas to the combustion chamber based at least in part on the measure related to flow and/or pressure in the measurement channel.

10. The method of claim 9, wherein the gas valve is housed by a gas valve body, and wherein the sensor and at least part of the measurement channel are housed by the gas valve body, and wherein the sensor is a mass flow sensor for sensing a measure of mass flow through the measurement channel.

11. The method of claim 9, wherein the measurement channel is fluidly coupled between the air bypass channel and a fuel bypass channel, wherein the fuel bypass channel extends from the fuel channel downstream of the gas valve and provides a bypass flow of fuel that bypasses at least part of the fuel channel before being ultimately delivered to the combustion chamber.

12. The method of claim 9, wherein the method compensates for one or more of: changes in mass air flow in the flow of air in the air supply channel caused by a blocked or partially blocked exhaust flue connected to the combustion chamber of the burner system; changes in mass air flow in the flow of air in the air supply channel caused by changes in air density; and/or changes in mass air flow in the flow of air in the air supply channel caused by changes in pressure of the air that is provided to the combustion chamber.

13. The method of claim 9, wherein the air bypass channel includes a first restrictor and a second restrictor that create a pressure divider, and wherein the measurement channel is fluidly coupled to the air bypass channel between the first restrictor and the second restrictor.

14. The method of claim 9 comprising adjusting the flow of gas to the combustion chamber via the gas valve based at least in part on the measure related to the mass air flow of the air that is provided to the combustion chamber.

15. A gas valve assembly comprising:
    a valve body;
    the valve body including an input port for receiving gas;
    the valve body including an output port for providing the received gas to a combustion chamber;

a valve housed by the valve body, the valve situated fluidly between the input port and the output port of the valve body for regulating a flow of gas that is delivered from the input port to the output port of the valve body through a fuel channel;

a valve actuator for controlling a position of the valve;

a mass air flow sensor housed by the valve body, the mass air flow sensor including a first port and a second port;

the valve body defining a fuel bypass channel, wherein the fuel bypass channel extends off the fuel channel downstream of the valve and provides a bypass flow of fuel that bypasses at least part of the fuel channel, the valve body including an air inlet port for receiving a pneumatic signal that is related to a mass air flow of air provided to the combustion chamber, the first port of the mass air flow sensor is fluidly coupled to the fuel bypass channel and the second port of the mass air flow sensor is fluidly coupled to the air inlet port of the valve body; and an electronic controller housed by the valve body and operatively coupled to the valve actuator and the mass air flow sensor, the electronic controller configured to control the position of the valve via the valve actuator to achieve a flow of gas to the output port of the valve body that is based at least in part on the mass air flow sensed by the mass air flow sensor.

16. A gas valve assembly of claim 15, wherein the controller is configured to transmit the mass air flow sensed by the mass air flow sensor to an external device.

17. The gas valve assembly of claim 15, wherein the controller is configured to compensate the position of the valve for changes in mass air flow caused by air density.

18. The gas valve assembly of claim 15, wherein the controller is configured to compensate the position of the valve for changes in mass air flow caused by a blocked or partially blocked exhaust flue connected to the combustion chamber.

19. The gas valve assembly of claim 15, wherein the controller is configured to compensate the position of the valve for changes in mass air flow caused by changes in pressure of the air flow that is provided to the combustion chamber.

20. The gas valve assembly of claim 15, wherein the controller of the gas valve assembly is configured to send a signal to adjust the flow of air to the combustion chamber based at least in part on the mass air flow sensed by the mass air flow sensor.

* * * * *